United States Patent
Eller et al.

(10) Patent No.: US 11,358,738 B1
(45) Date of Patent: Jun. 14, 2022

(54) SYSTEMS AND METHODS FOR ASSEMBLING SPACE FRAME STRUCTURES

(71) Applicant: LOCKHEED MARTIN CORPORATION, Bethesda, MD (US)

(72) Inventors: Michael R. Eller, New Orleans, LA (US); Darren Andrew Kearney, Slidell, LA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/173,056

(22) Filed: Feb. 10, 2021

(51) Int. Cl.
*B64G 1/10* (2006.01)
*B64G 99/00* (2009.01)
*B64G 1/44* (2006.01)
*B64G 4/00* (2006.01)

(52) U.S. Cl.
CPC .............. *B64G 1/10* (2013.01); *B64G 1/44* (2013.01); *B64G 9/00* (2013.01); *B64G 2001/1092* (2013.01); *B64G 2004/005* (2013.01)

(58) Field of Classification Search
CPC ... B64G 1/10; B64G 1/44; B64G 9/00; B64G 2001/1092; B64G 2004/005
See application file for complete search history.

(56) References Cited

U.S. PATENT DOCUMENTS

| | | | |
|---|---|---|---|
| 1,257,455 A | 2/1918 | Braun | |
| 3,921,360 A * | 11/1975 | Baldwin | E04B 1/1906 403/171 |
| 4,308,699 A * | 1/1982 | Slysh | E04H 12/182 403/171 |
| 4,323,319 A | 4/1982 | Adams | |
| 4,664,550 A | 5/1987 | Jachmann | |
| 4,932,807 A | 6/1990 | Rhodes | |
| 5,127,759 A | 7/1992 | Orbom | |
| 5,144,780 A | 9/1992 | Gieling | |
| 6,082,070 A | 7/2000 | Jen | |
| 6,378,265 B1 * | 4/2002 | Konstandt | E04B 1/1903 403/171 |
| 6,439,797 B1 | 8/2002 | Campbell | |
| 7,476,824 B2 | 1/2009 | Ananthanarayanan et al. | |
| D614,481 S | 4/2010 | Lewis | |
| 10,774,518 B1 | 9/2020 | Eller | |
| 2004/0182299 A1 * | 9/2004 | Kent | B28B 7/0029 114/266 |
| 2006/0053729 A1 | 3/2006 | Wallner | |
| 2010/0071141 A1 | 3/2010 | Reiner | |
| 2010/0083605 A1 * | 4/2010 | Wallner | B27J 1/00 52/749.1 |
| 2015/0064375 A1 | 3/2015 | Kunstadt | |

(Continued)

*Primary Examiner* — Valentina Xavier
(74) *Attorney, Agent, or Firm* — BakerHostetler

(57) ABSTRACT

A strut-and-node truss design that is applicable to space frame structure designs can be assembled with using robotic (semi-autonomous and/or fully autonomous) or telerobotic assembly/joining. The assembly system can include a storage module that includes the components for assembly and an assembly module that can retrieve and assembly the components. The resulting truss structure can be connected to an antenna (e.g., carried by the storage module) for deployment. The assembly module can be operated repeatedly in conjunction with additional resupply systems that provide additional components for assembly.

20 Claims, 25 Drawing Sheets

(56) References Cited

U.S. PATENT DOCUMENTS

| | | |
|---|---|---|
| 2015/0101645 A1 | 4/2015 | Neville et al. |
| 2015/0167713 A1 | 6/2015 | Schaerer et al. |
| 2019/0027835 A1 | 1/2019 | Hoyt |
| 2019/0135456 A1 | 5/2019 | Wingo et al. |
| 2019/0284792 A1* | 9/2019 | López Blanco ...... E04B 1/1903 |

* cited by examiner

SYSTEMS AND METHODS FOR ASSEMBLING SPACE FRAME STRUCTURES

STATEMENT REGARDING FEDERALLY SPONSORED RESEARCH OR DEVELOPMENT

Not Applicable.

TECHNICAL FIELD

The present description relates in general to space frame structures, and more particularly to, for example, without limitation, systems and methods for assembling space frame structures.

BACKGROUND OF THE DISCLOSURE

Space frame structures are one of the efficient and commonly used structures used on Earth and in space. Space frame structures are typically truss-like and are used for constructing: buildings, bridges, aircraft, automobiles, spacecraft, and tensegrity structures. Design of modern space frame structures has not changed much since the advent of mechanical fasteners and fusion welding processes back in the industrial revolution era. Hence many large space frame structures involve intricate assembly steps that require significant human interaction and skill. The majority of space frame structures require highly skilled fusion welders to make difficult pipe welds that are the most complicated and defect-ridden joints because of the difficult fit up, accessibility, and positioning required to make full circumferential welds. Thus far, space frame designs and methods suitable for robotic (semi-autonomous and/or fully autonomous) or telerobotic assembly/joining has not yet emerged as a viable solution to replace "handmade" truss structures.

The description provided in the background section should not be assumed to be prior art merely because it is mentioned in or associated with the background section. The background section may include information that describes one or more aspects of the subject technology.

Figure 1:
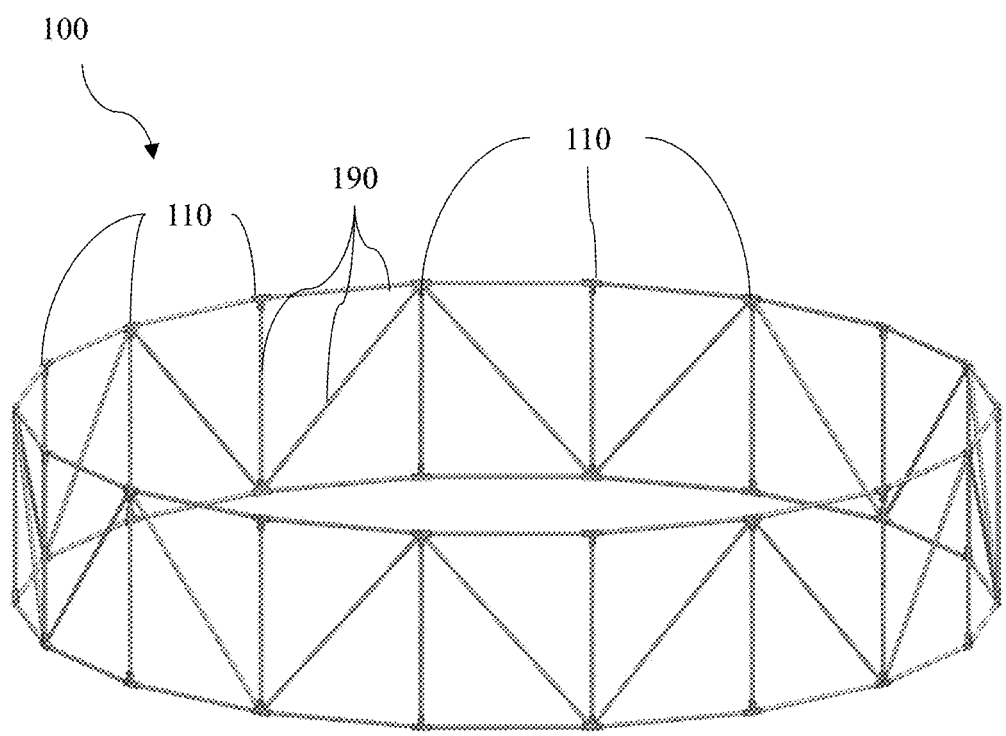
FIG. 1 illustrates a perspective view of an example of a rim truss structure, according to embodiments of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present disclosure provides a new design and method for assembling space frame structures with minimal human interaction. Using robotic assembly and joining methods to build large space frame structures on Earth will have a significant technology roadmap before it is deemed safe for humans to safely work and live on (and under) structures built by robots. Therefore, the most realistic near-term use for robotically manufactured space frame structures is where space frame construction is the most expensive and most difficult for humans to build by hand: outer space.

It can be desirable to build structures in space more efficiently to enable capability growth and capability preservation of various space-based functions such as human exploration, scientific discovery, and satellite operations. A significant limitation to growing and preserving these functions are the high cost and long lead time of transporting payloads into space. The payloads must be designed to withstand up to 10 G launch loads, but will ultimately operate in an environment with 0 G or minimal G-force loads. Therefore, a tremendous amount of design and configuration testing could be eliminated if the payload could be launched into orbit as raw materials and manufactured/assembled in space. Furthermore, the launching of raw materials instead of deployable/unfurlable payloads will create a transformational change in the volumetric packing efficiency within a given launch vehicle's payload fairing. Manufacturing and assembly of raw materials in space is complicated.

Modern space frame structures are expensive to manufacture and are almost always reliant on complex assembly procedures requiring human labor and skills. This is especially true for space transportation solutions because large payloads are required to deploy and unfurl since a suitable design and joining method for robotic assembly has not been developed yet.

It can be beneficial to introduce a specific joint that can be joined by robots instead of humans. Common truss structures in use today take advantage of the strut-and-node design to maximize structural stiffness with minimal weight.

One aspect of the present disclosure provides a strut-and-node truss design that is applicable to all space frame structure designs with using innovative robotic (semi-autonomous and/or fully autonomous) or telerobotic assembly/joining. Embodiments of the present disclosure can create transformational change to the space transportation and exploration as well as adoption into terrestrial construction industry. Assembly systems described herein are capable of mechanically assembling (e.g., by robots) space structures along with eventual immobilization of all the connections with brazing and/or welding.

The more conventional approach of welding each individual strut and node for hundreds or thousands of repeating segments gives rise to incredible difficulty with thermal distortion, misalignment tolerances, and tolerance stack-up. Furthermore, such constructions requires a complex 3-D fillet joint that is equivalent to performing a pipe weld. Corresponding techniques impose difficulty achieving the proper weld penetration on this type of joint given the geometry of the fit-up and the limited accessibility to view and inspect the weld.

3-D printing techniques currently cannot produce multi-materials such as a composite tube with metallic ends that have a neutral CTE similar to what is being proposed for some of the in-space structures in this invention. 3-D printing of metals in particular also suffers from severe thermal distortion because of the amount of heat that is required and the time the heat must be applied to make a part (or entire structure) from raw materials. Just the thermal distortion witnessed from making a small number of welds on a truss structure is enough to make misalignment tolerances one of the biggest challenges to control. Furthermore, the amount of power required in space for making such a large structure is much more prohibitive than the brazing or deposition approach outlined in this invention.

The strut and node designs described herein enable use of brazing or deposition as joining technologies that utilize less power and energy than welding. The reduced heat input enables our the disclosed approach to achieve the fine tolerances required for building precise truss structures in space for reflector antennas, telescopes, etc. The assembly systems can transport densely packed building materials and effectively secure them for deployment. The assembly modules thereof can be reused by providing additional components in a resupply system.

Referring now to FIG. 1, applications of a node-and-strut design can include an assembly of truss structures that serve as structural support for devices, such as antennas. As shown in FIG. 1, one example of an assembly configuration is a cylindrical truss rim that is the structural stiffening element for a mesh reflector element that is tensioned to the truss rim. The truss structure 100 can be assembled in space from raw materials: struts 190 and node members 110 and 110. The struts 190 can be, for example, graphite epoxy and bonded aluminum ends and the node members can include, for example, aluminum, titanium, and the like.

A robot or other assembly mechanism can assemble the entire structure with mechanical connections first to ensure that everything can fit into the proper locations before fixing them in place. The engagement between the struts 190 and the node members 110 can facilitate adjustments between different temporary arrangements so the components can be assembled in stages. Once the truss structure 100 has been fully assembled with mechanical joints, the robotic welding head can bond, weld, fuse, or otherwise fixedly couple each joint. This allows the truss structure 100 to retain fine assembly tolerances with minimal distortion.

Figure 2:
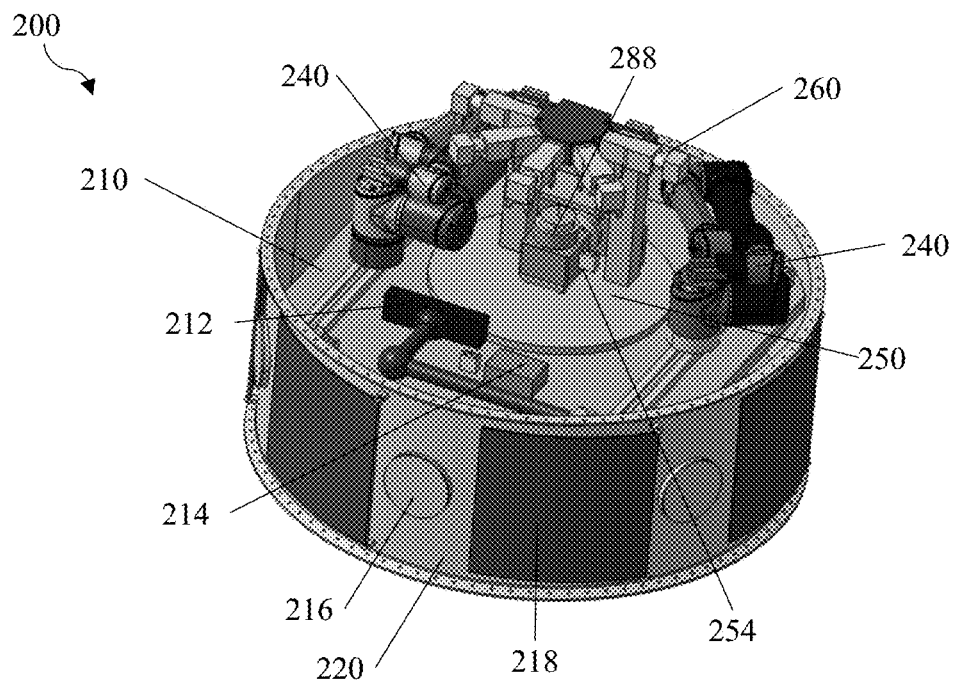
FIG. 2 illustrates a perspective view of an example of an assembly module, according to embodiments of the present disclosure.

Referring now to FIGS. 2-5, an assembly module can be operated to assembly components of a truss structure for satellites while in space. As shown in FIG. 2, an assembly module 200 can include a support base 210, an outer panel 220, and various assembly components mounted to the support base 210 and/or within the outer panel 220. Such assembly components can include one or more actuation arms 240 extending from the support base 210 and an assembly unit 260 for aligning and joining nodes and struts for securement to each other, as described further herein. The assembly module 200 can further include a weld head 288 to be advanced and apply a force while welding the node 110 when positioned on the assembly unit 260.

The assembly module 200 can further include components to facilitate assembly of truss structures. For example, as further shown in FIG. 2, the assembly module 200 can include a metrology unit 212, a LIDAR unit 214, a camera and/or light 254, and/or other components for monitoring, controlling, and/or guiding operation of the assembly components (e.g., actuation arms 240, assembly unit 260, and/or the weld head 288).

The assembly module 200 can further include other components to for operation in space. For example, as further shown in FIG. 2, the assembly module 200 can include one or more radiator elements 218 for managing heat. The assembly module 200 can further include one or more interface elements 216. metrology unit 212, a LIDAR unit 214, a camera and/or light 254, and/or other components for monitoring, controlling, and/or guiding operation of the assembly components (e.g., actuation arms 240, assembly unit 260, and/or the weld head 288).

Figure 3:
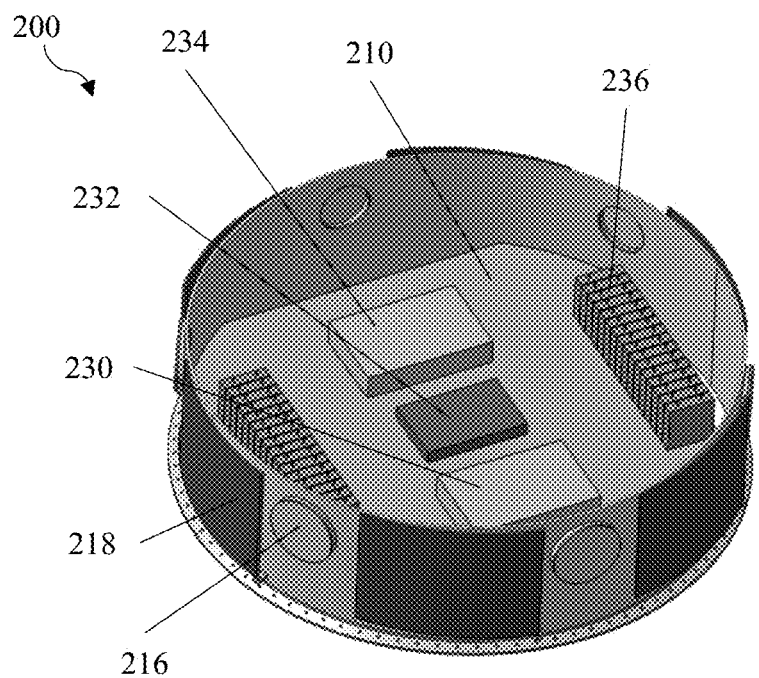
FIG. 3 illustrates another perspective view of the assembly module of FIG. 2, according to embodiments of the present disclosure.

As shown in FIG. 3, the assembly module 200 can further include other components to for operation in space. At least some of these components can be positioned on a side of the support base 210 that is opposite other components. For example, the support base 210 can support one or more processing modules 230, one or more power distribution systems 232, one or more remote electronics 234, one or more batteries, 236, and the like. These and/or other components can be covered with a lid (not shown). Additionally, heat pipes can be provided to manage heat (e.g., by circulating to the radiator elements 218).

Figure 4:
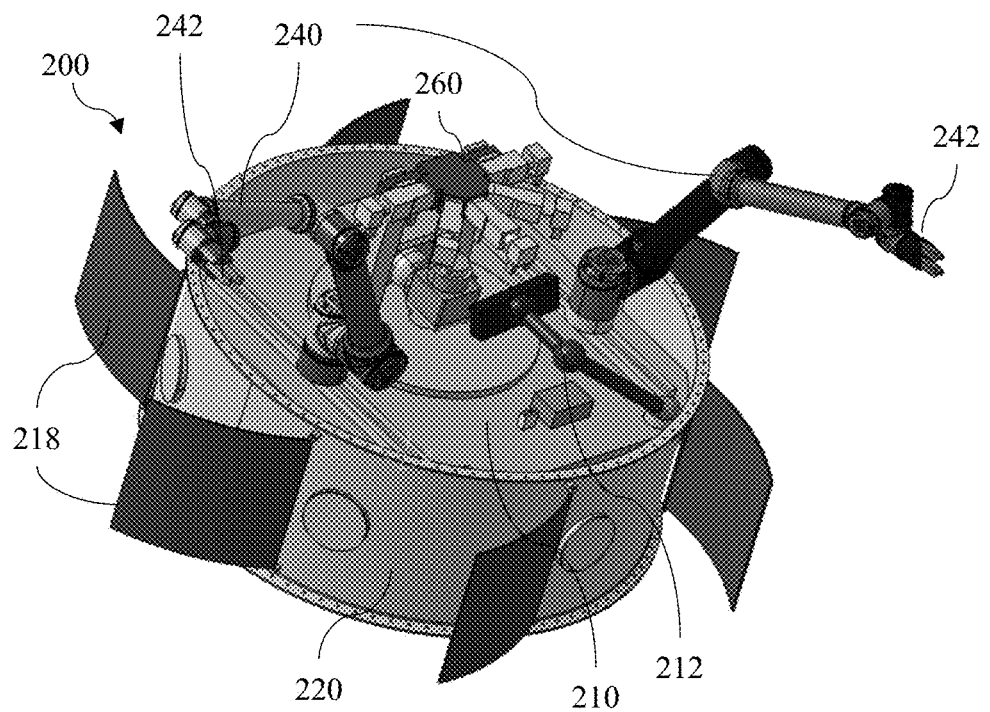
FIG. 4 illustrates another perspective view of the assembly module of FIG. 2 with components in a deployed configuration, according to embodiments of the present disclosure.

As shown in FIG. 4, the radiator elements 218 of the assembly module 200 can be deployed, for example by extending away from the outer panel 220 that defines an outer periphery of the assembly module 200.

As further shown in FIG. 4, the actuation arms 240 can be deployed to act on components as needed. Each of the actuation arms 240 can include one or more articulating joints for extending, moving, and/or pointing an end effector 242 in any given location and/or direction. At an end of the actuation arm 240 that is opposite the end effector 242, the actuation arm 240 can move relative to the support base 210. For example, the actuation arm 240 can move along one or more tracks and/or guides of the support base 210.

Figure 5:
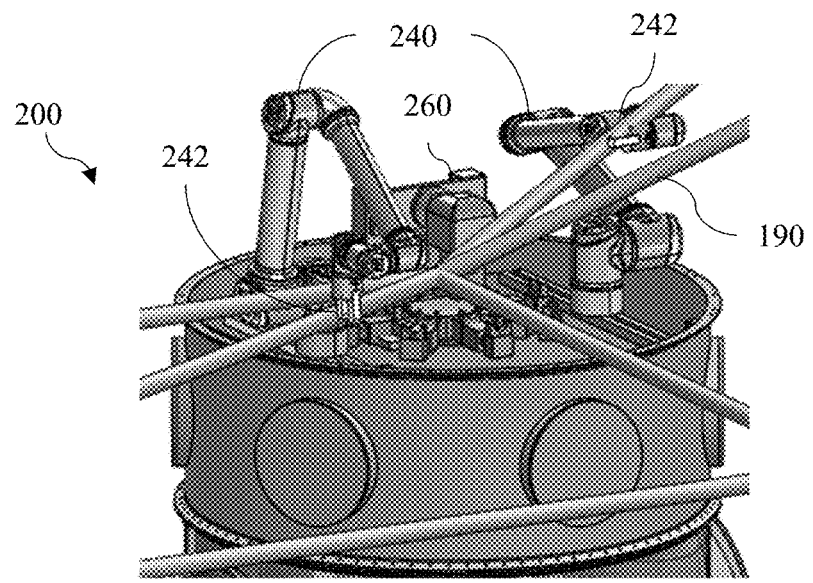
FIG. 5 illustrates another perspective view of the assembly module of FIG. 2 in a stage of assembling a truss structure, according to embodiments of the present disclosure.

As shown in FIG. 5, the actuation arms 240 can retrieve and/or position one or more struts 190 at the assembly unit 260 to secure the struts 190 to each other and/or one or more nodes, as described further herein. As one region of the resulting trust structure is secured, the actuation arms 290 can move and/or adjust the resulting trust structure and/or had additional struts 190 to expand the structure.

Figures 6, 7:
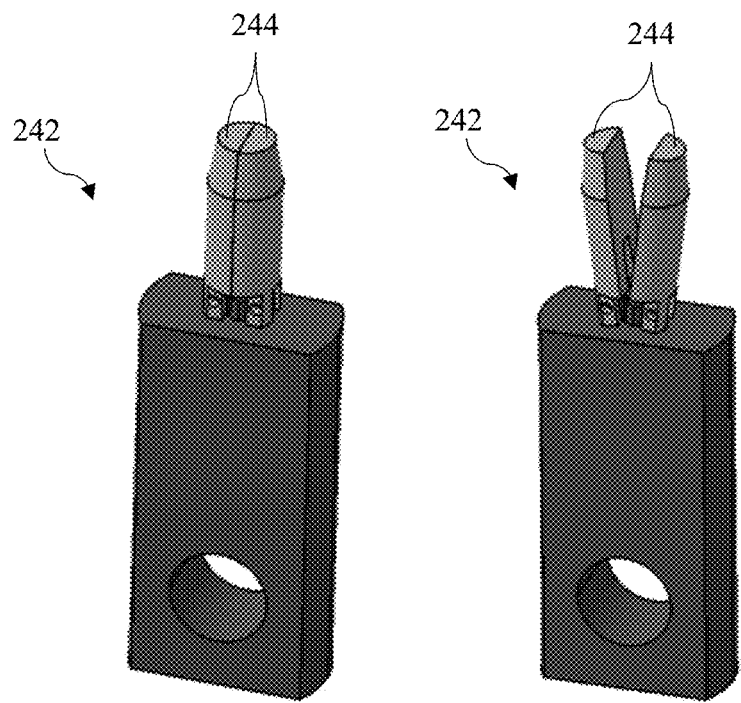
FIG. 6 illustrates a perspective view of an example of an end effector for an actuator arm, according to embodiments of the present disclosure.
FIG. 7 illustrates a perspective view of the end effector of FIG. 7 with fingers in a splayed configuration, according to embodiments of the present disclosure.
Figure 8:
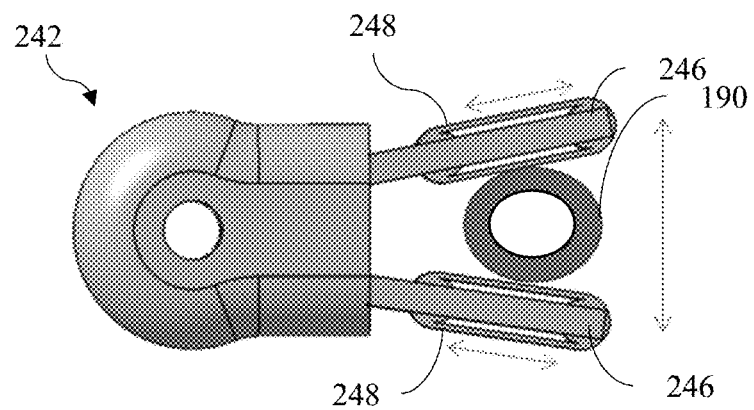
FIG. 8 illustrates a perspective view of an example of an end effector for an actuator arm, according to embodiments of the present disclosure.

Referring now to FIGS. 6-8, one or more of a variety of end effectors can be provided for operation by and/or with an actuation arm. The end effectors can be used to retrieve, position, and/or manipulate struts and/or nodes in preparation for assembly and/or deployment.

As shown in FIGS. 6 and 7, an end effector 242 can include multiple fingers 244 that are configured to engage an inner surface within the corresponding strut. For example, the fingers 244 splay apart to engage inner surfaces. Such engagement can be useful when hollow, tubular struts are densely packed, but their exposed ends allow access to inner walls thereof.

As shown in FIG. 8, another end effector 242 can include a pair of fingers 246 that are configured to engage an outer surface of a strut. For example, the fingers 246 can be pivotably coupled to each other to controllably grasp an outer surface of a strut 190 on opposing sides thereof. Each of the fingers 246 can include a continuous band 248 that is driven by at least one wheel. The opposing bands 248 can be operated to apply a torque to the strut 190 and rotate it to a desired orientation. For example, the bands 248 can be operated simultaneously and in particular directions (e.g., clockwise or counter-clockwise) until the desired orientation is achieved.

Additionally or alternatively, it will be understood that other types of end effectors can be employed with any given actuation arm. For example, end effectors can be employed to achieve welding and/or brazing of components to each other. Any given actuation arm can have one or more of any given end effector. In some embodiments, the end effectors of any given actuation arm can be swapped and/or exchanged with one or more other end effectors. As such, different end effectors can be utilized for a given task and/or stage of assembly. Alternative end effectors can be stored with the assembly module and/or another module for access by the actuation arms.

Figure 9:
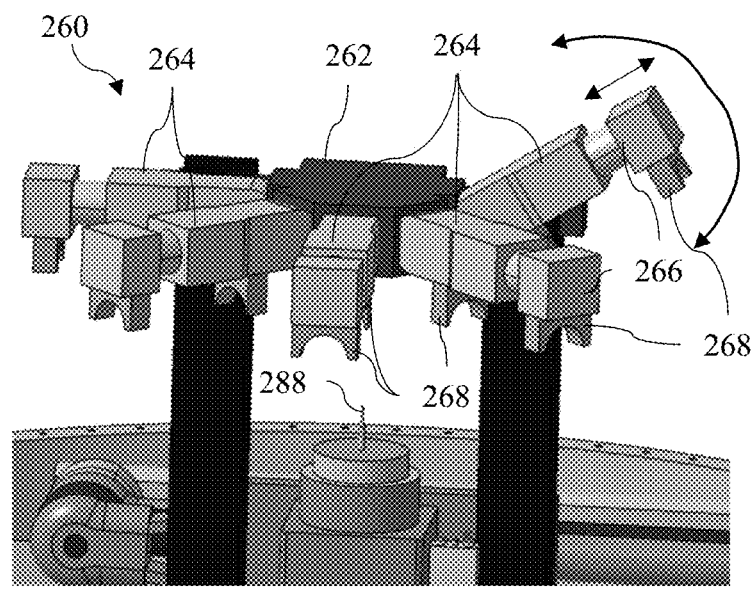
FIG. 9 illustrates a perspective view of an example of an assembly unit of an assembly module, according to embodiments of the present disclosure.
Figure 10:
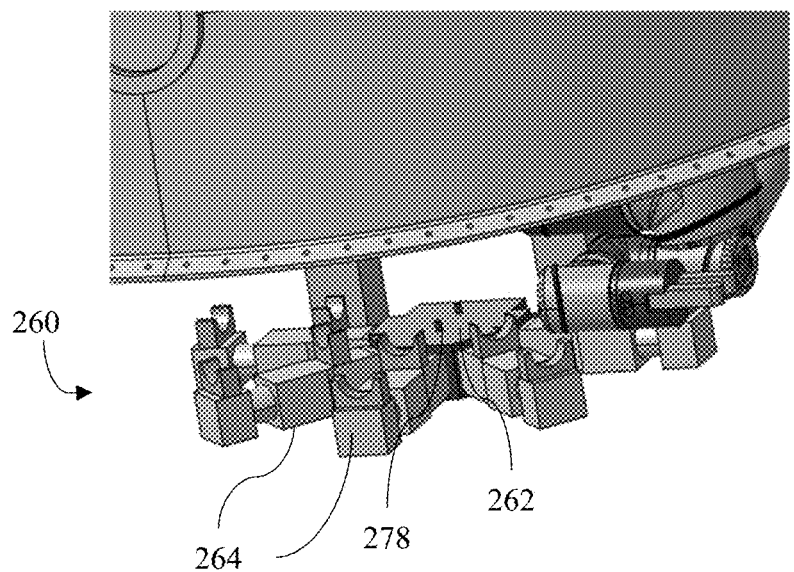
FIG. 10 illustrates another perspective view of the assembly unit of FIG. 9, according to embodiments of the present disclosure.

Referring now to FIGS. 9 and 10, an assembly unit can facilitate alignment and securement of components to form a truss structure. As shown in FIG. 9, the assembly unit 260 can include an assembly table 262 that provides one or more surfaces for supporting a workpiece, such as a node. As shown in FIG. 10, the assembly table 262 can include one or more securement pins 274 engaging at least a portion of a node. While the node is secured at the securement pin 278, the node can be held in place while other components (e.g., struts) are aligned with and/or inserted into the node.

The assembly unit 260 can further include multiple assembly arms 264 extending form the assembly table 262. Each of the assembly arms 264 can be configured to secure a corresponding strut 190 with respect to the node. For example, each of the assembly arms 264 can have one or more gripper elements 268 that can securely hold a portion of a corresponding strut. Where a given assembly arm 264 includes multiple gripper elements 268, each of the gripper elements 268 can be positioned to securely hold a different longitudinal portion of the corresponding strut. Each of the gripper elements 268 can controllably grasp the corresponding strut.

In some embodiments, one or more of the assembly arms 264 can include segmented portions to form end segments 266. Such segments can be longitudinally extended relative to other portions of the assembly arms 264. As such, the total length of the assembly arms 264 and/or distance between gripper elements 268 can be controllably adjusted. Where the gripper elements 268 are individually controlled to grasp, a given one of the gripper elements 268 (e.g., on the end segment 266) can grasp the strut while moving longitudinally toward or away from the assembly table 262. Accordingly, the struts can be individually inserted into or removed from the node held at the assembly table 262.

In some embodiments, one or more of the assembly arms 264 can pivot relative to the assembly table 262. For example, one or more of the assembly arms 264 can extend away from a single focal point, with each assembly arm 264 pivotable within a plane that extends through the focal point. The planes can optionally converge at a line that intersects the focal point. The pivoting of the assembly arms 264 can be performed so that the corresponding strut is oriented and aligned with a corresponding channel of the node. Additionally or alternatively, the individual segments of the assembly arms 264 can articulate and/or rotate relative to each other to provide additional degrees of freedom.

Figure 11:
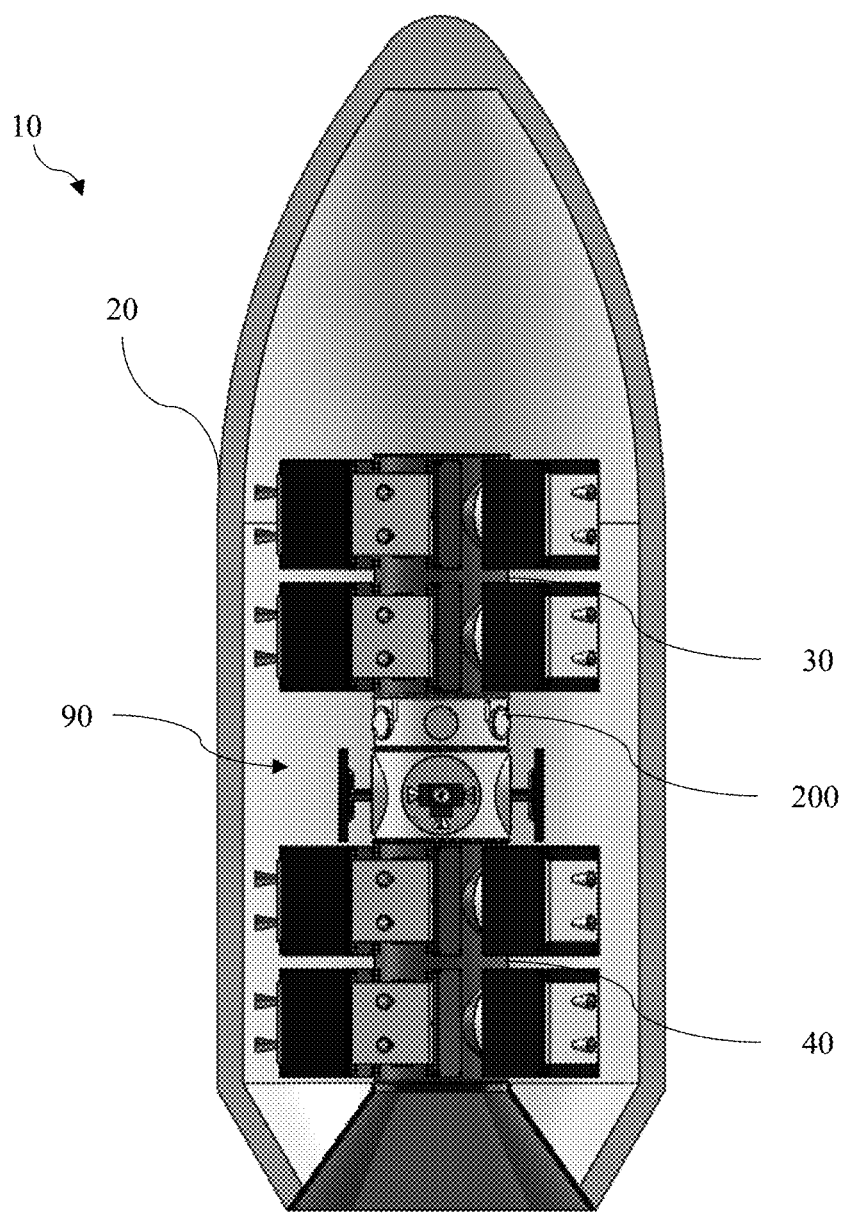
FIG. 11 illustrates partial cutaway view of a space shuttle containing an assembly system, according to embodiments of the present disclosure.

Referring now to FIGS. 11-17, an assembly system can be part of and/or transported by a space shuttle. For example, as shown in FIG. 11, a space system 10 can include an assembly system 90 that can fit within and/or be coupled to a space shuttle 20. The space shuttle 20 can include and/or operate in concert with a rocket, a propulsion system, a thruster, a booster, and the like. The assembly system 90 can fit within an interior space of the space shuttle 20 for deployment upon transport to a target location (e.g., space orbit, etc.).

As further shown in FIG. 11, the assembly system 90 can include the assembly module 200, as described herein, and/or one or more storage modules, such as first storage module 30 and second storage module 40. Each of the storage modules 30, 40 can be coupled to opposing sides of the assembly module 200. The assembly system 90 and its constituent parts can be deployed together from the space shuttle 20.

Figure 12:
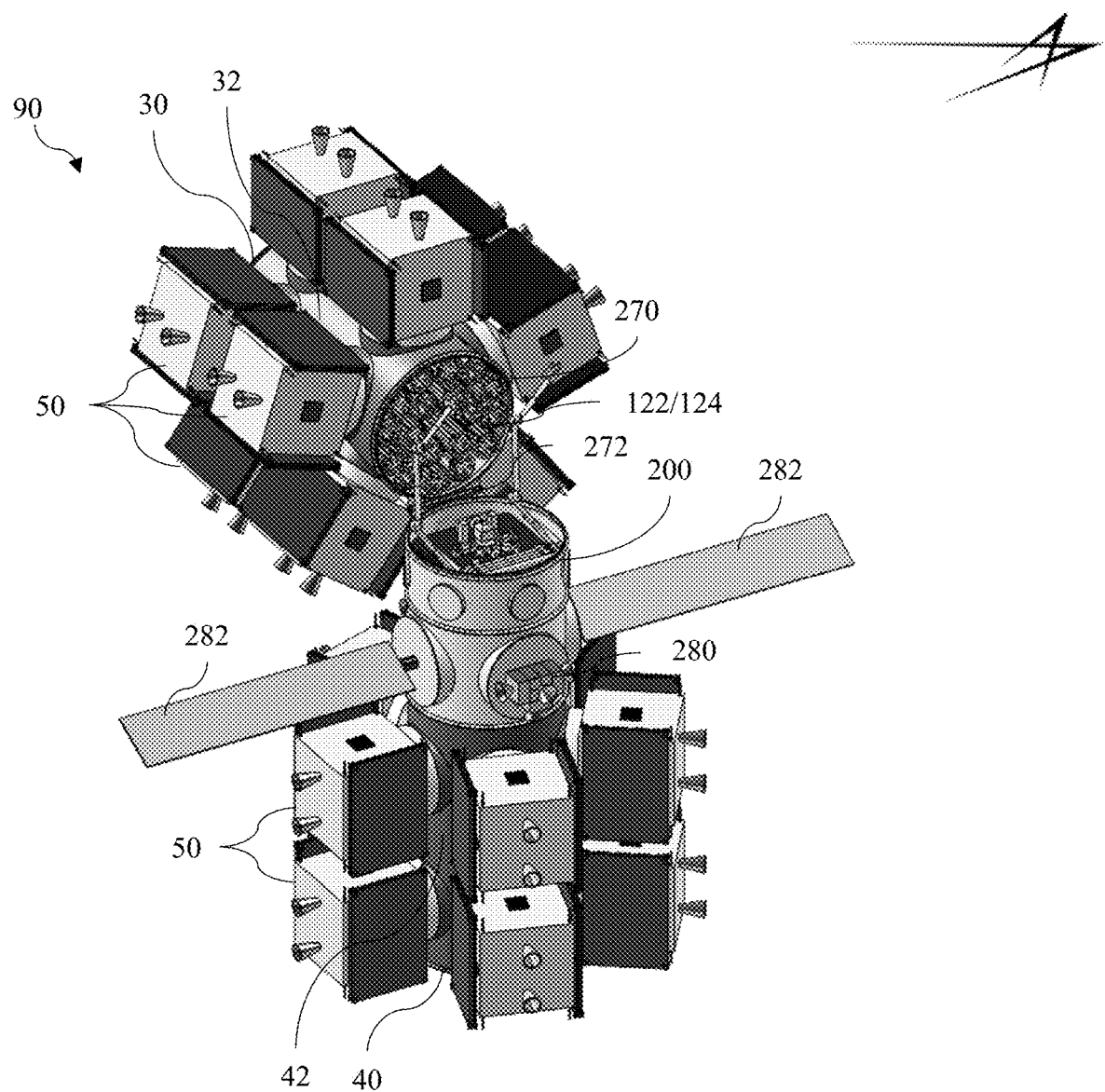
FIG. 12 illustrates a perspective view of an assembly system with an end of a storage module exposed, according to embodiments of the present disclosure.

As shown in FIG. 12, the assembly module 200 can include one or more engagement elements 270 for releasably securing to one of the storage modules 30, 40. For example, the engagement element 270 can be pivotably coupled to the support base and/or the outer panel of the assembly module 200. For example, a hinge 272 can be provide to controllably facilitate such pivoting action. The engagement element 270 can form a hoop or other shape that is configured to releasably couple to the corresponding one of the storage modules 30, 40. For example, the engagement element 270 can couple to the housing 32 of the storage module 30 and pivot relative to the support base and/or the outer panel of the assembly module 200 to expose an interior of the housing 32 of the storage module 30.

As shown in FIG. 12, the housing 32 of the storage module 30 can contain components for assembly. For example, the housing 32 of the storage module 30 can contain bundles 122 and/or 124 that can be assembled together by the assembly module 200. Such bundles can include nodes, struts, reflector elements, panels, and the like for joining together.

The storage modules 30, 40 can further include satellite modules 50 for assembly with the components assembled by the assembly module 200. For example, the satellite modules 50 can be attached to an exterior surface of the housing 32 and deployed therefrom as desired. By providing components such as nodes, struts, reflector elements, panels, and the like within an interior of a housing 32, a greater number of satellite modules 50 can be provided on an exterior surface of the housing 32. As such, fewer missions may be required to deploy a given number of satellites. For example, in the depicted embodiment, 20 satellites can be deployed from a single system to establish a constellation with the 20 satellites. This can provide substantial advantages over deployment systems that deliver a smaller number (e.g., 8) of satellites in each system, as such systems would thereby require more launches and deployments to achieve the same constellation coverage.

The assembly module 200 can include solar panels 282 deployable from the periphery of the support base and/or the outer panel of the assembly module 200. Power generated by the solar panels 282 can be stored and/or used to operate components of the assembly module 200 and/or other modules coupled thereto. The assembly module 200 can include one or more thrusters 280 for maneuvering the assembly module 200 and/or modules coupled thereto. Additionally or alternatively, the thrusters 280 can be operated to move the assembly module 200 relative to other modules, as described further herein.

Figure 13:
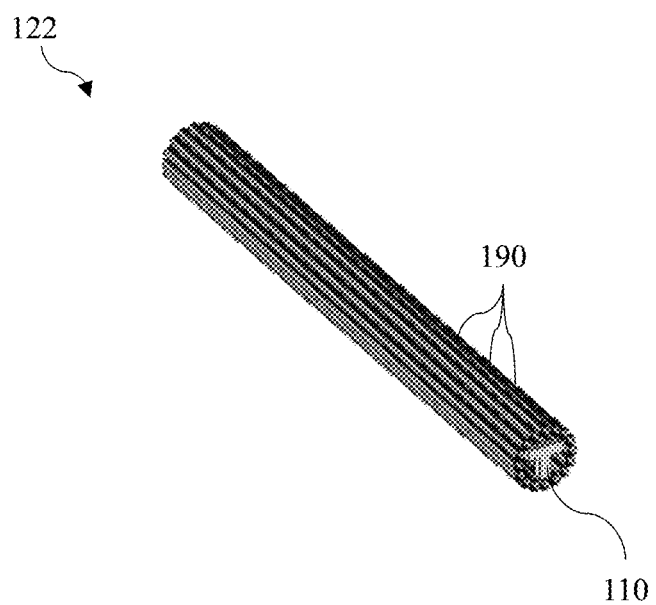
FIG. 13 illustrates a perspective view of a bundle of struts and nodes, according to embodiments of the present disclosure.

Referring now to FIGS. 13-16, the components for assembly can be stored, delivered, and/or deployed as bundles. As shown in FIG. 13, a bundle 122 can include struts 190 surrounding one or more nodes 110. The nodes 110 can be arranged in a column or row within an interior space surrounded by the struts 190. The bundle 122 can be deployed in part or whole from the corresponding storage module.

Figure 14:
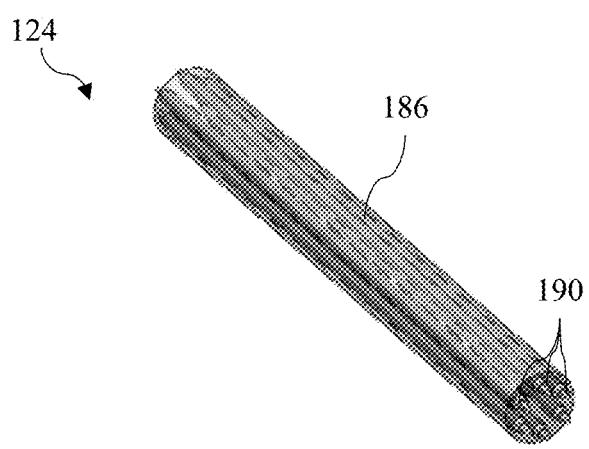
FIG. 14 illustrates a perspective view of a bundle of struts and a reflector element, according to embodiments of the present disclosure.

As shown in FIG. 14, a bundle 124 can include struts 190 and a reflector element 186. The nodes 110 can be arranged in a column or row within an interior space surrounded by the struts 190. The bundle 122 can be deployed in part or whole from the corresponding storage module. Optionally, one or more nodes (not shown) can be arranged in a column or row within an interior space surrounded by the struts 190 and/or the reflector element 186. The bundle 124 can be deployed in part or whole from the corresponding storage module.

Figure 15:
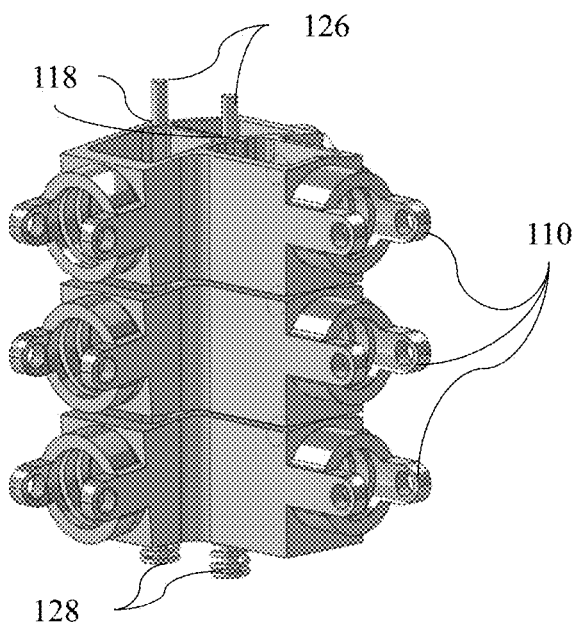
FIG. 15 illustrates a perspective view of a set of nodes in a retracted configuration, according to embodiments of the present disclosure.

As shown in FIG. 15, a bundle can include a system for controllably storing and deploying the nodes. For example, one or more guide rails 126 can be provided, with multiple nodes 110 being moveable along the one or more guide rails 126. Each of the nodes 110 can have an engagement element 118 configured to engage with the guide rail 126 such that the nodes 110 are moveable along the guide rail(s) 126. For example, the engagement elements 118 can include holes, channels, grooves, and/or openings that have shape and/or size that corresponds to the guide rails 126. These engagement element 118 can further be used to engages with the securement pins of the assembly table (see FIG. 10).

Figure 16:
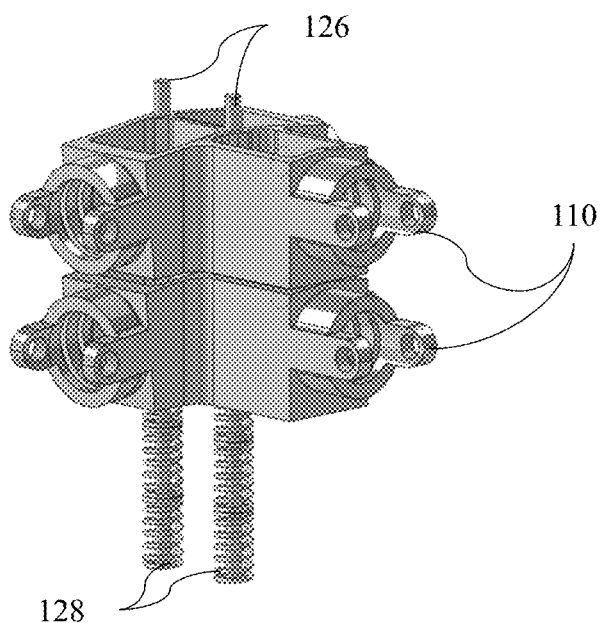
FIG. 16 illustrates a perspective view of a set of nodes in an advanced configuration, according to embodiments of the present disclosure.

As shown in FIG. 16, a spring element 128 can be provided to bias the nodes 110 in a direction, for example toward an end of the guide rail 126. As the nodes 110 are individually deployed, the remaining nodes 110 can advance to be positioned for ready deployment. A stopper (e.g., detent) can be provided at an end so that the leading node 110 is not deployed until forcefully removed in a manner that overcomes the influence of the stopper.

Figure 17:
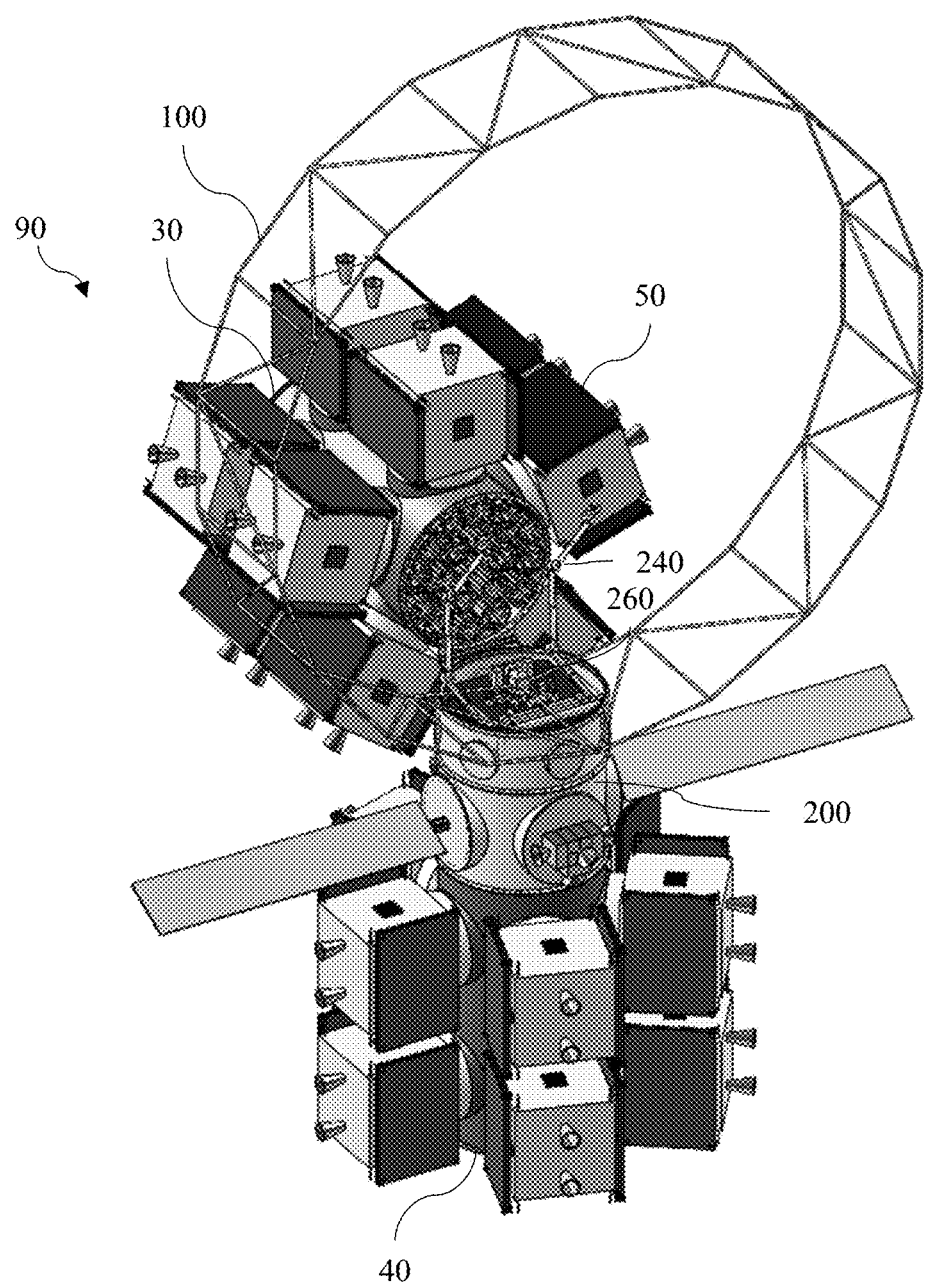
FIG. 17 illustrates a perspective view of an assembly system with an assembled truss structure, according to embodiments of the present disclosure.

As shown in FIG. 17, the assembly module can be operated to retrieve and assemble the components deployed from the storage module. For example, the actuation arms 240 can retrieve and/or position one or more struts 190 at the assembly unit 260 to secure the struts 190 to each other and/or one or more nodes 110. As one region of the resulting trust structure is secured, the actuation arms 240 can move and/or adjust the resulting trust structure and/or had additional struts 190 to expand the structure.

Figure 18:
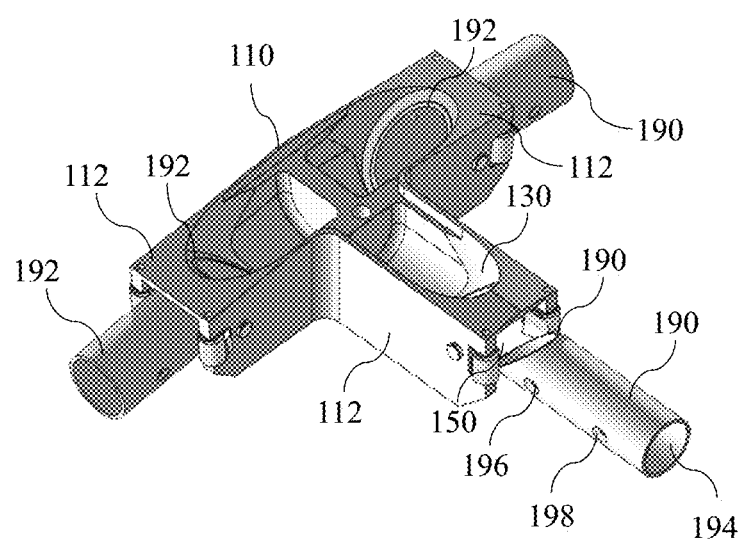
FIG. 18 illustrates a perspective view of an example of a node member with struts, according to embodiments of the present disclosure.

Referring now to FIG. 18, a truss structure can include one or more node members 110 and struts 190 coupled together through an assembly process that results in a secure arrangement. The node member 110 can include a main body 112 that defines an outer periphery, one or more channels 150, and one or more internal chambers 130. The channels 150 can be open to, in fluid communication with, or otherwise connected to one or more internal chambers 130 formed by the main body 112 of the node member 110. The internal chambers 130 can provide access to a terminal end 192 of a strut 190 when the strut 190 is within the channel 150. A single node member 110 can couple to multiple struts 190, and multiple node member 110 can be provided to form an overall truss structure. For example, multiple channels 150 can be provided, with each extending inwardly into the main body 112 from an outer periphery thereof. While three struts 190 are shown in FIG. 18, any number of struts 190 can be joined to a single node member 110. Additionally or alternatively, a single strut 190 can couple to multiple node members 110 (e.g., at opposite ends of the strut 190), and multiple struts 190 can be provided to form an overall truss structure A strut 190 can include terminal ends 192, wherein a given terminal end 192 is configured to fit within a corresponding channel 150 of the node member 110. The struts 190 can include multiple engagement elements for interacting with corresponding elements of the node member 110 when the strut 190 is inserted into the channel 150. For example, the struts 190 can include, at or near one or more ends thereof, one or more outer strut engagement elements 196 and one or more inner strut engagement elements 198. The outer strut engagement elements 196 can be closer to a terminal end 192 than are the inner strut engagement elements 198. It will be understood that the terms "inner" and "outer" do not necessarily refer to radially inner and radially outer, but can instead refer to relative longitudinal positions of the engagement elements. The strut engagement elements 196 and 198 can alternatively engage with corresponding engagement elements of the node member 110 at different amounts of insertion of the strut 190 into the channel 150.

Figure 19:
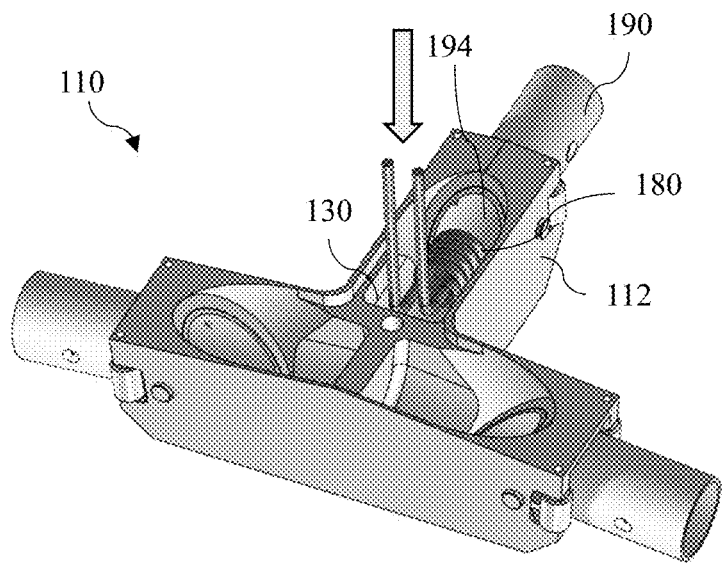
FIG. 19 illustrates a perspective view of a node member and strut with a welding element, according to embodiments of the present disclosure.
Figure 20:
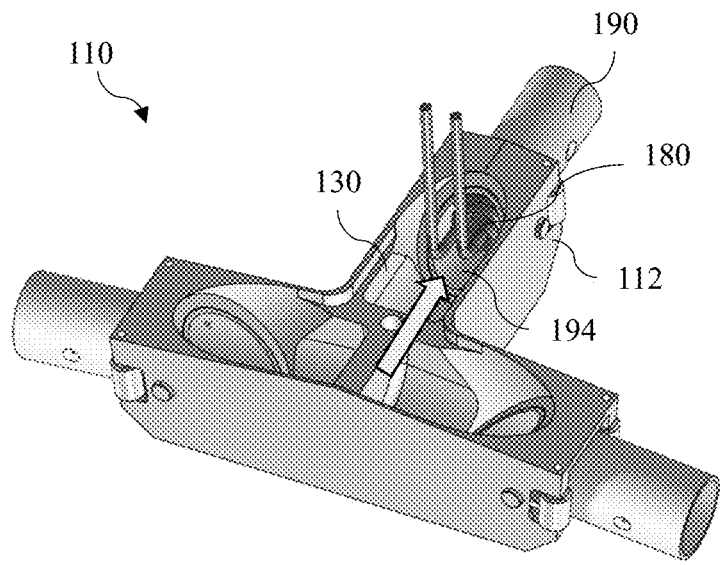
FIG. 20 illustrates a perspective view of the node member and strut of FIG. 19 with the welding element, according to embodiments of the present disclosure.

Referring now to FIGS. 19 and 20, a bonding element can be provided to fix the strut in place relative to a node member. For example, the main body 112 of the node member 110 can form an annular recess radially adjacent to the channel. A bond element can be disposed radially between the main body 112 and the strut 190. The bond element can form a ring or other shape. The bond element can be configured to bond to the strut 190 and/or the node member 110 when heat is applied. The bond element can include a metal having a melting point that is lower than a melting point of the main body 112 and a melting point of the strut 190. Such a metal can include an aluminum alloy, an aluminum-silicone alloy, a titanium alloy, a titanium-silicone alloy, and the like.

As shown in FIGS. 19 and 20, bonding the strut 190 to the node member 110 can be performed with a heating element 180. For example, the heating element can be an inductive element, such as a coil configured to receiving an electrical current. Other types of heating elements are contemplated, such as resistive heating elements, electron beams, laser welders, and the like. By applying heat to (e.g., inducing electrical current in) the bond element 134, the bond element 134 can melt and fuse to the strut 190 and the node member 110.

Access to the bond element can be provided through an internal chamber 130 of the node member 110. While the strut 190 is within the node member 110, the lumen 194 of the strut 190 can be open to the internal chamber 130. The heating element 180 can be provide at an end of an actuator arm or other robotic or automated mechanism. For example, the heating element 180 can be or replace an end effector of a given actuator arm. The heating element 180 can be inserted into the internal chamber 130 and then advanced into the lumen 194 of the strut 190 to be aligned with the bond element. Additionally or alternatively, heat can be applied from outside of the strut 190 to melt and fuse the bond element.

Additionally or alternatively, the terminal end of the strut 190 can be bonded and/or fused to a surface of the node member, such as the surface 132 facing the internal chamber 130. Such bonding can be done from outside of a lumen 194 (if any) of the strut 190 with an applicable end effector of an actuator arm.

The truss nodes can be configured such that the joining end effector has unobstructed line of sight access to the strut 190 and an interface plane of the node member 110. This enables 2-dimensional welding, brazing, or deposition onto this interface area with minimal degrees of robotic manipulation. To access all the strut end joints in this manner, the ends of the struts 190 can be cut at an angle (as high as 60 degrees or as low as 30 degrees) and inserted into an annular hole or slot to position the strut for welding to the node member 110. When configured specifically for brazing, the node members 110 have pre-installed braze rings within grooves in the node slot for bonding to inserted struts. Line of sight access is not required for some brazing operations that simply need to insert a heating element 180, such as an induction coil, resistance heating element, or a laser or electron beam into the open end of the strut 190. These struts can be cut, for example, at a 90° angle and still enable minimal robotic articulation to bond the node members 110 to the struts 190. The heat source only needs to articulate inside the lumen 194 of the strut 190 along the longitudinal axis of the strut 190 in order to apply the heat to the pre-installed braze rings within the channels.

It will be understood that the ends 192 of the struts 190 can form one or more of a variety of shapes, and the node member 110 can accommodate such shapes. For example, the ends 192 of the struts 190 can be squared (e.g., circular in cross-section) to be essentially flat. It will be understood that multiple engagement elements can be provided in staggered (e.g., axially offset) arrangements. It will be understood that multiple bond elements can be provided in staggered (e.g., axially offset) arrangements. For example, two or more bond elements 134 can be provided for bonding and/or fusing at different axial regions of the node member 110 and the strut 190. The multiple bond elements 134 can be melted simultaneously or at different times.

Figure 21:
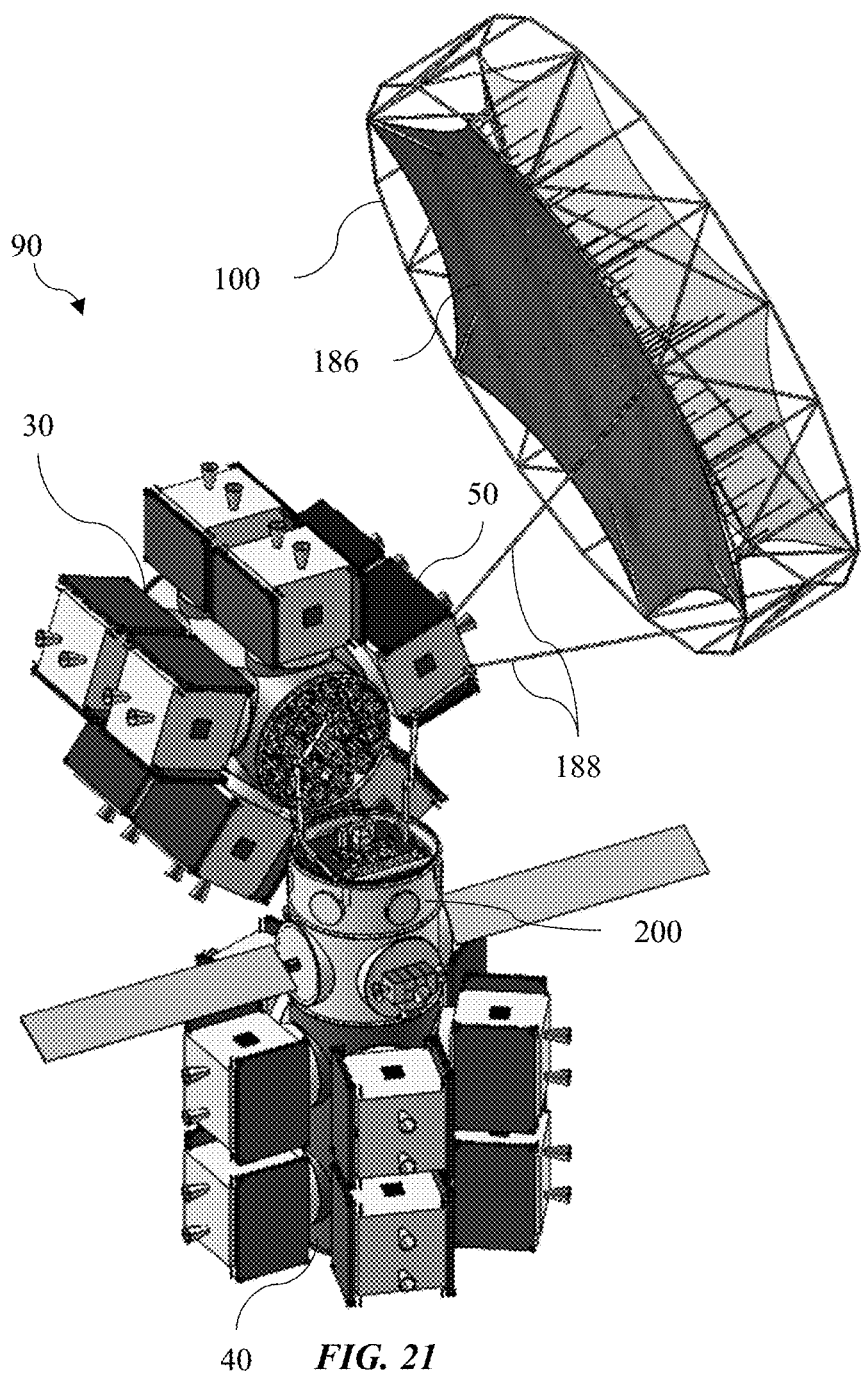
FIG. 21 illustrates a perspective view of an assembly system with a truss structure installed on a satellite module, according to embodiments of the present disclosure.

As shown in FIG. 21, the truss structure 100 (optionally including a reflector element 186) can be coupled to a satellite module 50. For example, the actuation arms 240 can be operated to join the truss structure 100 to a corresponding one of the satellite modules 50 with a connector 188. Such coupling can be performed by the actuation arms 240 and/or another component of the assembly module 200 or another module.

Figure 22:
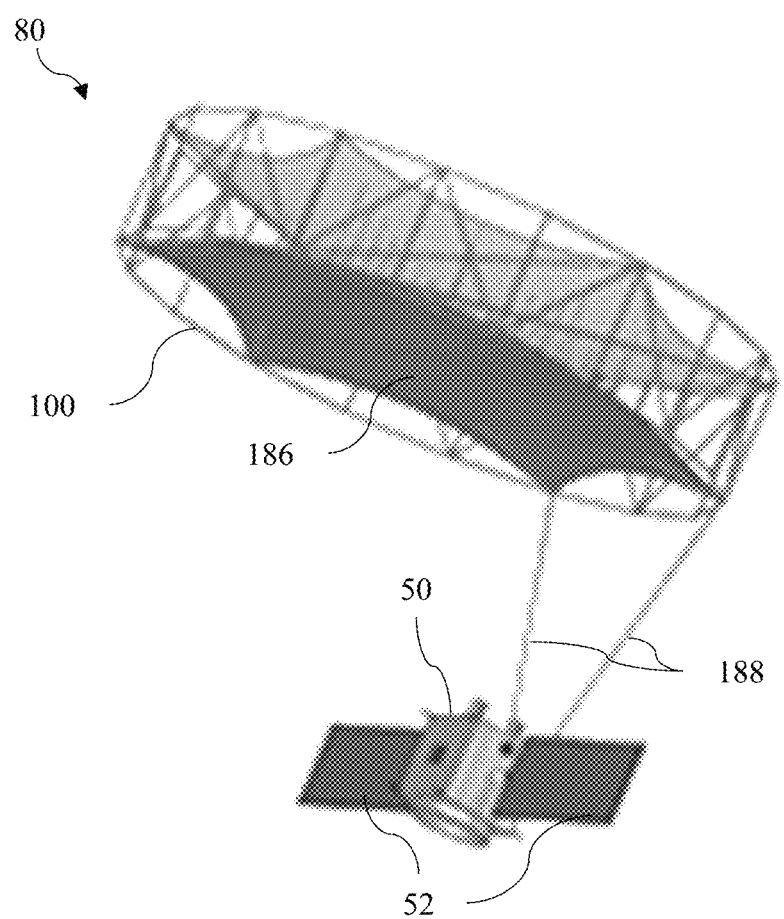
FIG. 22 illustrates a perspective view of a satellite deployed from the assembly system of FIG. 21, according to embodiments of the present disclosure.

As shown in FIG. 22, the satellite module 50 can be released to deploy the assembled satellite 80. The satellite 80 can thereafter operate independently. For example, the satellite 80 can include and/or deploy solar panels 52 and/or other components to perform and/or facilitate performance of the functions of the satellite 80.

Figure 23:
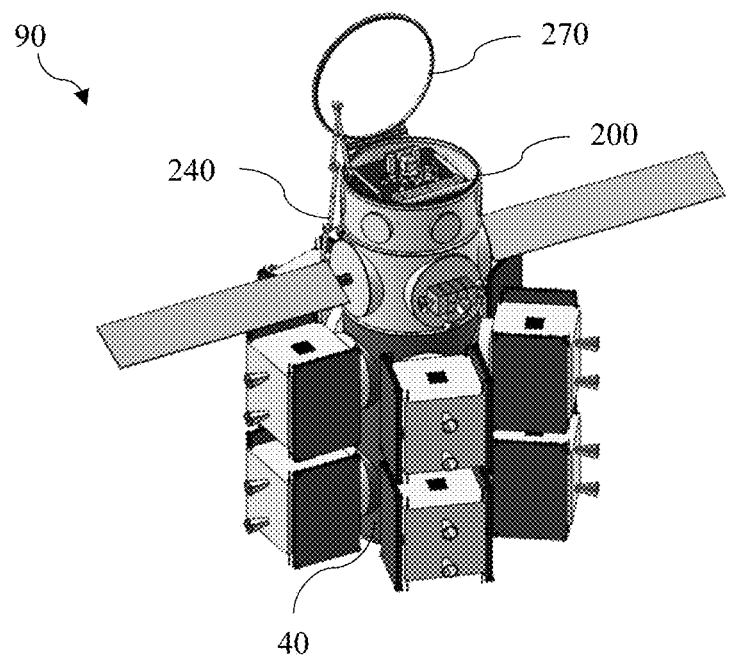
FIG. 23 illustrates a perspective view of an assembly system including an assembly module and a single remaining storage module, according to embodiments of the present disclosure.

As shown in FIG. 23, following assembly and deployment of one or more (e.g., all) satellites of a given storage module, the given storage module can be released from the engagement element 270 of the assembly module 200. Where an additional storage module 40 is provided, the assembly module can be repositioned to assemble and deploy satellites from the additional storage module 40.

Figure 24:
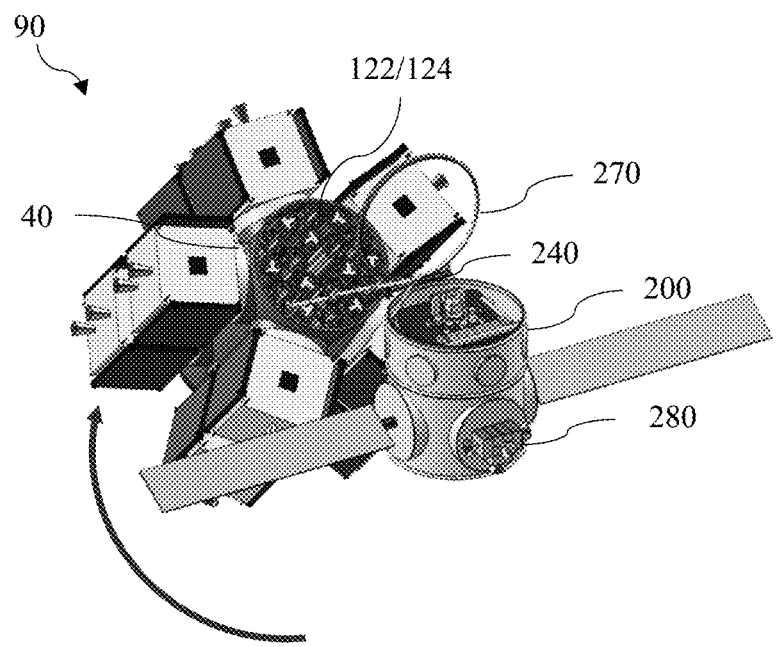
FIG. 24 illustrates a perspective view of an assembly system with an assembly module detaching from the storage module, according to embodiments of the present disclosure.

For example, as shown in FIG. 24, the actuation arms 240 can grasp and/or otherwise engage the storage module 40, and reorient the assembly module 200 relative to the storage module 40 until the engagement element 270 is positioned to engage the storage module 40. In some embodiments, the actuation arms 240 can maintain a connection until the engagement element 270 is aligned. Optionally, the thruster 280 can be operated to facilitate such reorientation.

Figure 25:
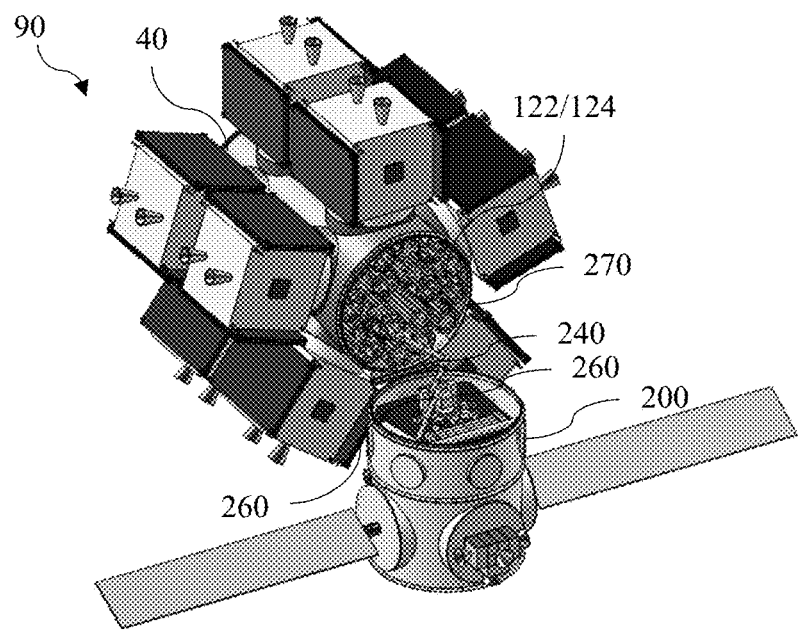
FIG. 25 illustrates a perspective view of an assembly system with an assembly module attaching to an exposed end of the storage module, according to embodiments of the present disclosure.

As shown in FIG. 25, the assembly module 200 can be operated to retrieve and assemble the components deployed from the storage module 40. For example, as with the storage module 30 (see FIGS. 12-22), the actuation arms 240 can retrieve and/or position one or more components of bundles 122, 124 at the assembly unit 260 to secure the components (e.g. struts and nodes) each other. Subsequent connection to satellite modules and deployment of satellites can be performed, as described herein.

Figure 26:
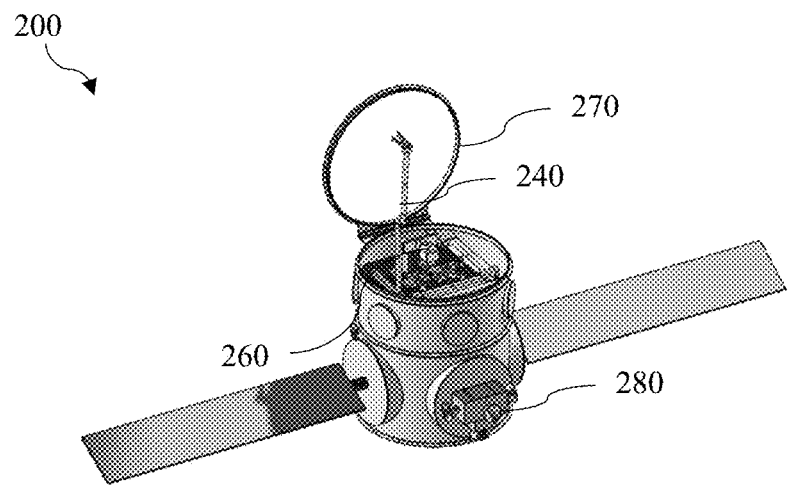
FIG. 26 illustrates a perspective view of an assembly module following detachment from all storage modules, according to embodiments of the present disclosure.

As shown in FIG. 26, following assembly and deployment of one or more (e.g., all) satellites of an additional storage module, the additional storage module can be released from the engagement element 270 of the assembly module 200. However, the assembly module 200 can remain operational and be reused upon resupply of additional components.

Figure 27:
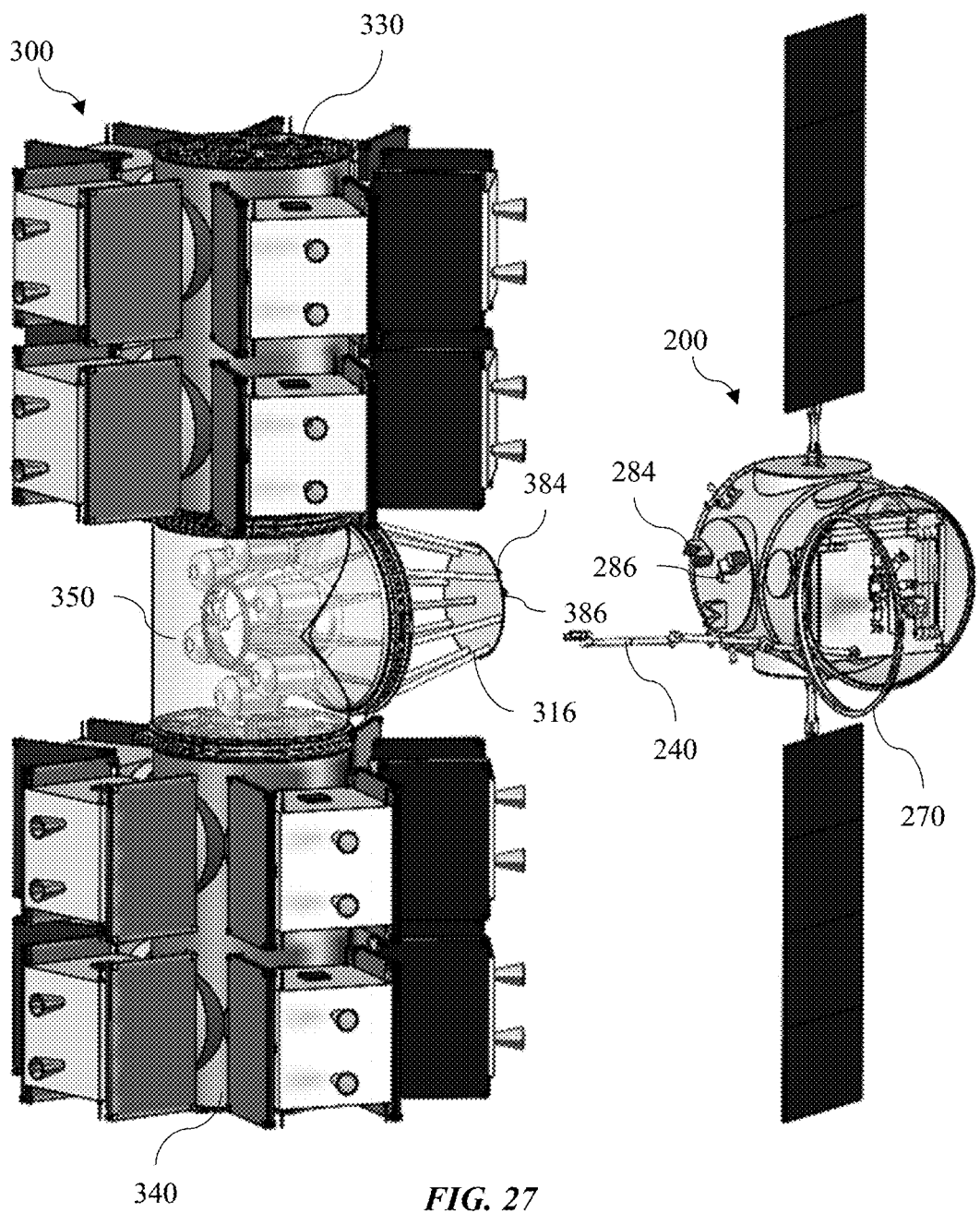
FIG. 27 illustrates a perspective view of an assembly module and a resupply system, according to embodiments of the present disclosure.

As shown in FIG. 27, a resupply system 300 can be provided to an assembly module 200. The assembly module 200 can include engagement elements 284 and/or interface elements 286 for connecting, communicating, and/or transferring with corresponding engagement elements 384 and/or interface elements 386 of the resupply system 300. For example the resupply system 300 can include an engagement module 350 with a platform 316 providing the engagement elements 384 and/or interface elements 386 of the resupply system 300.

Figure 28:
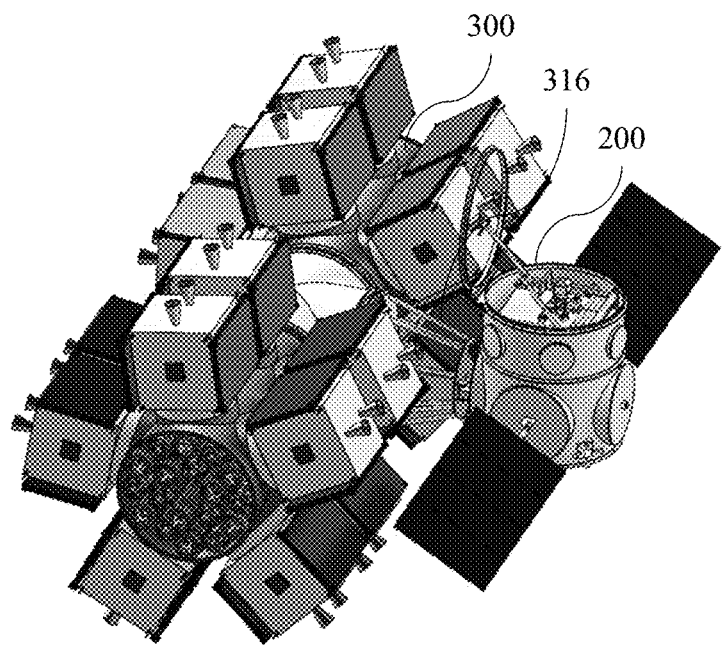
FIG. 28 illustrates a perspective view of an assembly module attached to the resupply system, according to embodiments of the present disclosure.

As shown in FIG. 28, the actuation arms 240 and/or other elements of the assembly module 200 can be operated to facilitate the coupling between the assembly module 200 and the platform 316 of the resupply system 300. The engagement element 270 of the assembly module 200 can optionally remain free to engagement with a storage module of the resupply system 300 in a subsequent stage.

Figure 29:
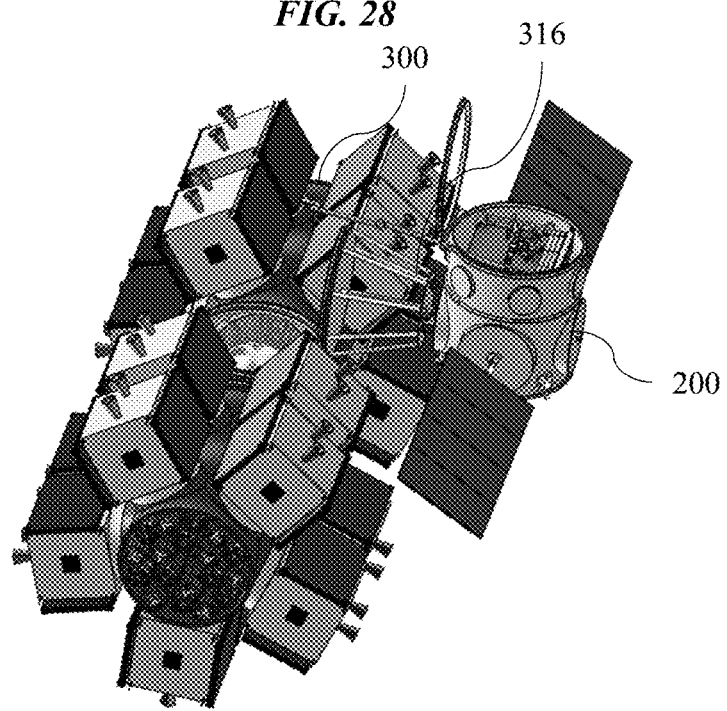
FIG. 29 illustrates a perspective view of the assembly module attached to the resupply system while the engagement element of the resupply system pivots, according to embodiments of the present disclosure.

As shown in FIG. 29, the platform 316 of the resupply system 300 can pivot relative to one or more other portions of the resupply system 300 to provide access to one or more storage modules of the resupply system 300. Such pivoting can also cause the assembly module 200 to change its position and/or orientation relative to the one or more other portions of the resupply system 300.

Figure 30:
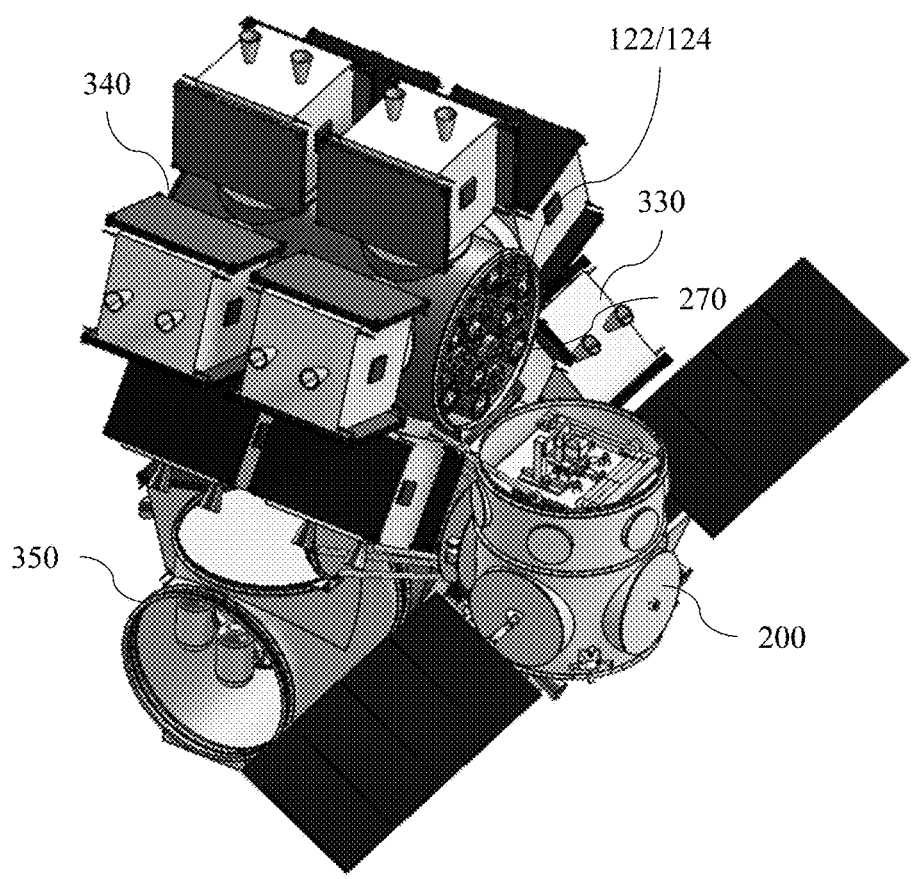
FIG. 30 illustrates a perspective view of the assembly module attached to an exposed end of a storage module of the resupply system, according to embodiments of the present disclosure.

As shown in FIG. 30, one of the storage modules, such as storage module 340 can pivot and/or detach from the engagement module 350 of the resupply system 300 and be engaged by the engagement element 270 of the assembly module 200. For example, the actuation arms can grasp and/or otherwise engage the storage module 340, and reorient the assembly module 200 relative to the storage module 340 until the engagement element 270 is positioned to engage the storage module 340. In some embodiments, the actuation arms 240 can maintain a connection until the engagement element 270 is aligned. Optionally, the thruster of the assembly module 200 can be operated to facilitate such reorientation. The assembly module 200 can be operated to retrieve and assemble the components deployed from the storage module 340. For example, as with the storage modules of the original assembly system (see FIGS. 12-22), the actuation arms 240 can retrieve and/or position one or more components of bundles 122,124 at the assembly unit to secure the components (e.g. struts and nodes) each other. Subsequent connection to satellite modules and deployment of satellites can be performed, as described herein.

It will be understood that resupply can be performed as many times as is desired to continue to assembly and deploy satellites using the same assembly module 200.

Referring now to FIGS. 31-38, the struts and node members described herein can be used to assembly one or more of a variety of truss structures. It will be understood that the examples provided herein are not limiting, and that yet other examples and applications are contemplated.

Figure 31:
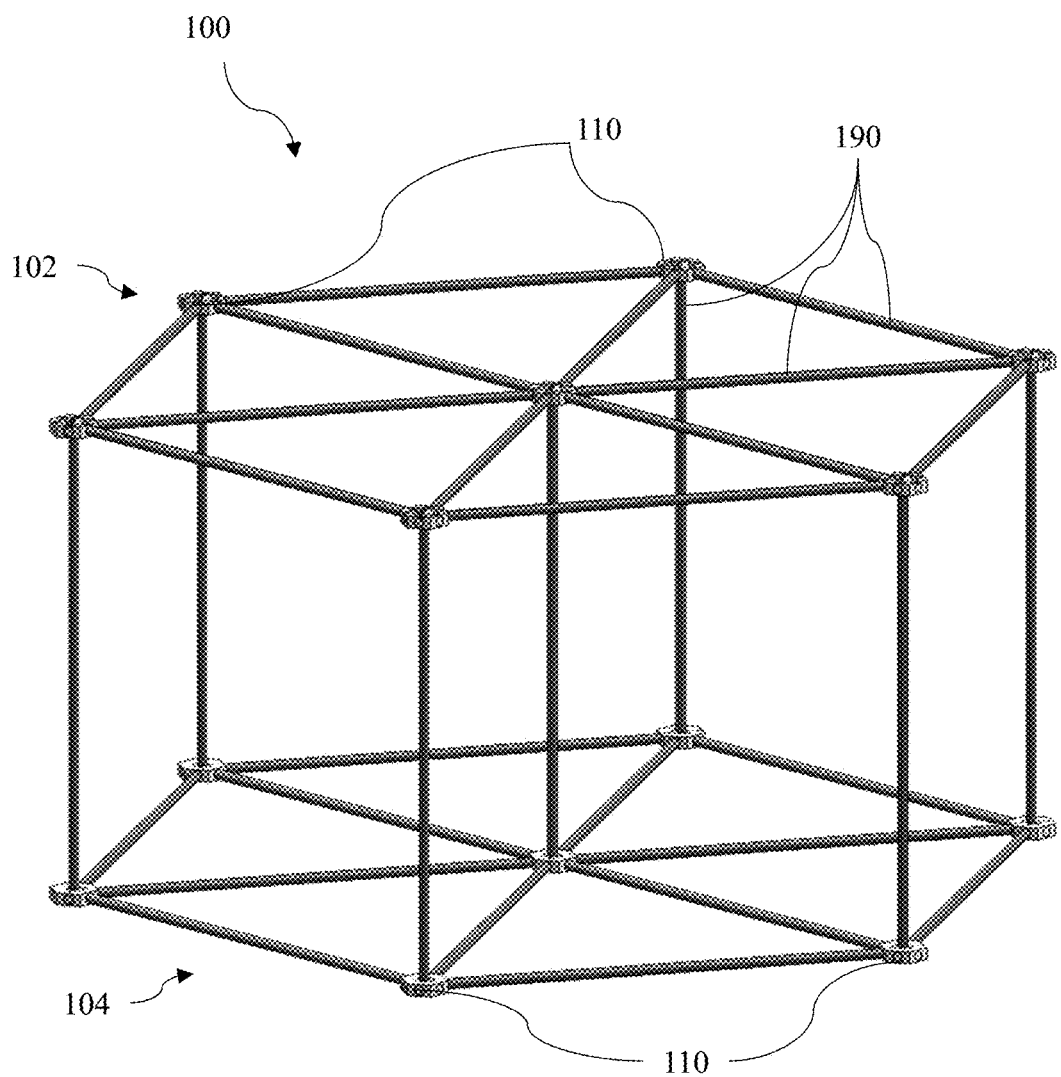
FIG. 31 illustrates a perspective view of an example of a first order (1-ring) truss structure with a hexagonal node design, according to embodiments of the present disclosure.

FIG. 31 illustrates a perspective view of an example of a first order (1-ring) truss structure with a hexagonal node design. As shown in FIG. 31, when full assembled with node members 110 connecting struts 190 in a hexagonal arrangement, a first order (1-ring) truss 100 can be produced. Robotic assembly and welding is enabled by the joint design in which all the weld joints on a side of the truss structure 100 can be welded on a common side of each corresponding node member 110 (e.g., from just the top or bottom of the truss structure 100). For example, the node members 110 on a first side 102 can provide welding areas all facing in a common first direction, and the node members 110 on a second side 104 can provide welding areas all facing in a common second direction. Hence, the robot(s) do not need to work their way in between the top and bottom plane to access the weld joints. Accessibility between the top and bottom planes can become restrictive as the structure gets larger and more complicated, so the robot can assemble and weld a multitude of these truss structure types without needing to be customized to fit within different size truss members and corresponding clearances.

Figure 32:
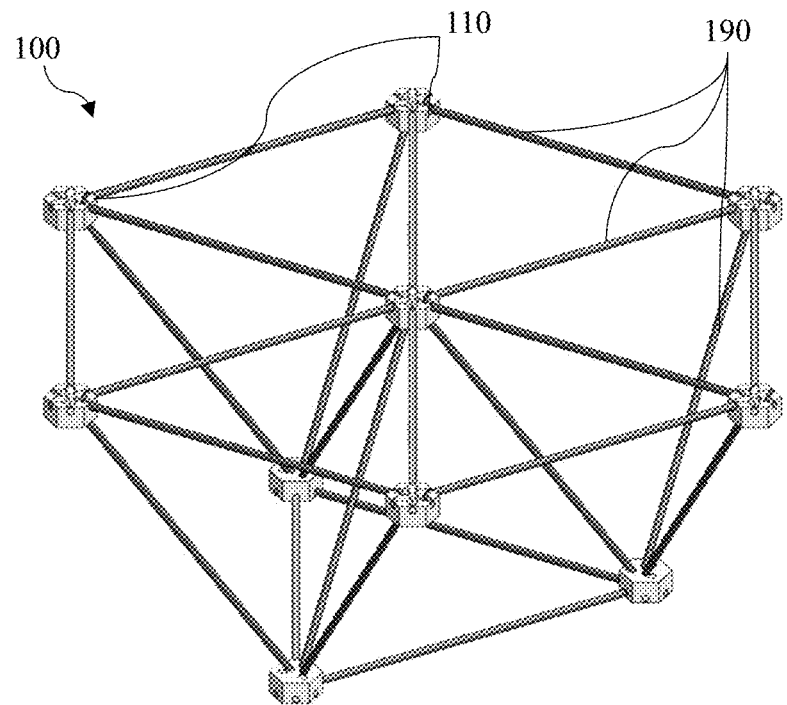
FIG. 32 illustrates a perspective view of an example of a first order (1-ring) truss structure with hexagonal node design, according to embodiments of the present disclosure.
Figure 33:
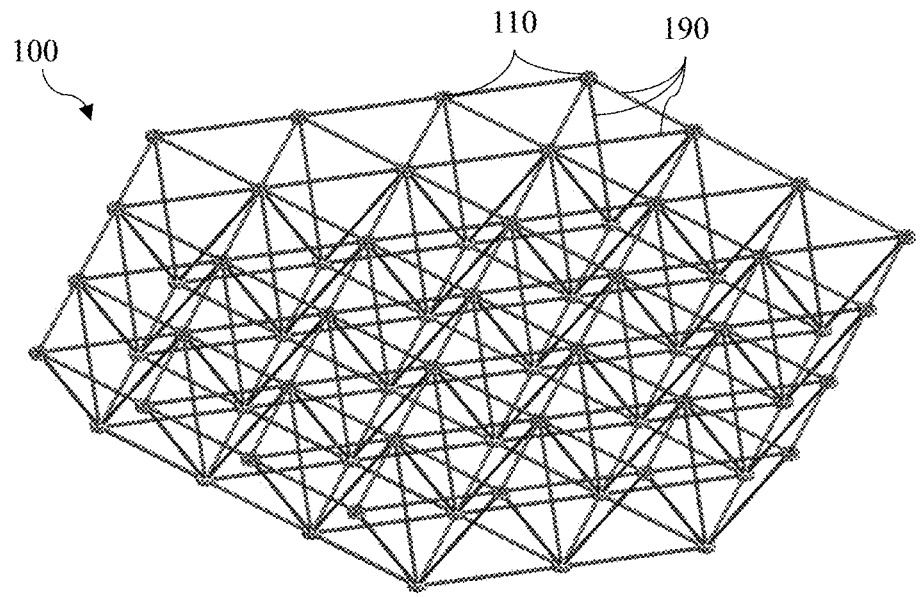
FIG. 33 illustrates a perspective view of an example of a first order (3-ring) truss structure with hexagonal node design, according to embodiments of the present disclosure.

Referring now to FIGS. 32 and 33, a more complex version of the node member described herein is a tetrahedral node member that enables some of the most efficient space frame structures. Such a truss structure 100 uses similar hexagonal strut-to-node connections, but has three struts 190 coming off the bottom instead of just one. A 1-ring tetrahedral and 3-ring tetrahedral truss structure are shown in FIGS. 32 and 33. The additional strut connections requires a thicker node member 110, but all the strut ends of the struts 190 can still be welded from a fixed, swiveling position on the top plane.

While the tetrahedral structure shown in FIGS. 32 and 33 are illustrated with substantially flat top and bottom faces, it will be understood that these structures can have a parabolic curvature to one or both of the top and bottom faces. A substantially parabolic curvature enables placement of mirrors at the nodes for telescope applications. Such structures can also be used for aerobrake applications.

Figure 34A:
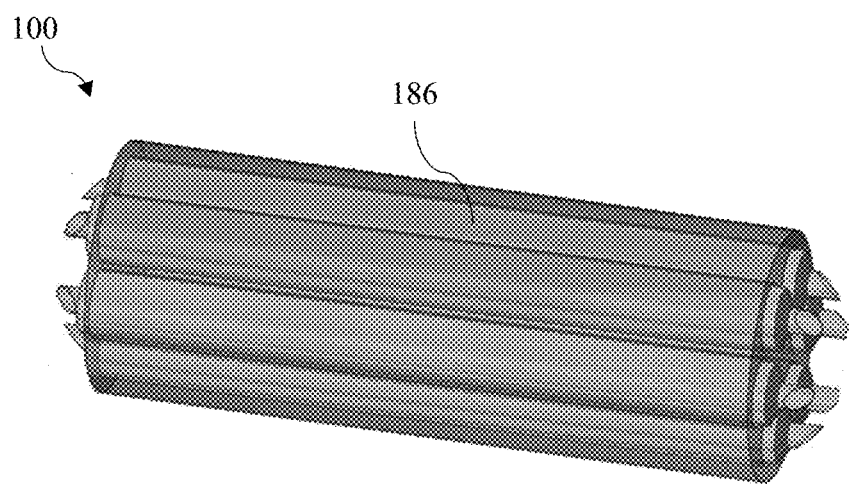
FIGS. 34A and 34B illustrate perspective views of an example of rim truss structure integrated with tensegrity reflector assembly to enable large aperture RF antenna in a collapsed configuration (FIG. 34A) and an expanded configuration (FIG. 34B), according to embodiments of the present disclosure.
Figure 34B:
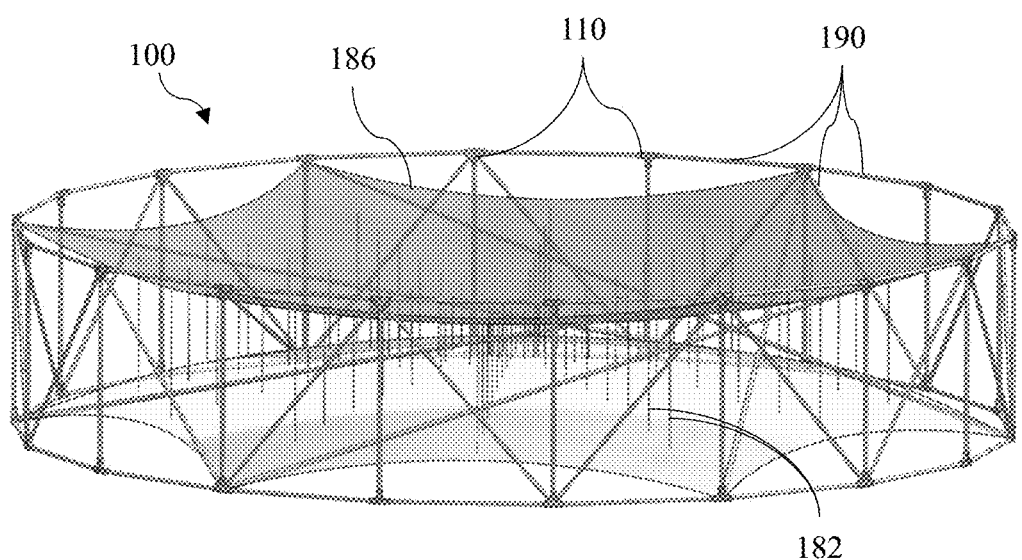

In completion of a cylindrical antenna, the rim truss structure can be integrated with a mesh or mirrored reflecting element to communicate (e.g., with RF signals from Earth). FIGS. 34A and 34B illustrate perspective views of an example of rim truss structure integrated with tensegrity reflector assembly to enable large aperture RF antenna in a collapsed configuration (FIG. 34A) and an expanded configuration (FIG. 34B). As shown in FIGS. 34A and 34B, a reflector element 186 (e.g., mesh) can utilize a tensegrity design that uses struts 190 and tension wires 182 to maintain a large aperture shape with moderate precision. At large diameters, the tensegrity elements interface with the cylindrical rim truss structure via mechanical and/or welded joints at the same node members 110 used for making the rim truss structure 100. The tension wires 182 can be adjusted using robotic arms and mechanisms after it has been joined to the rim truss structure 100.

Figure 35A:
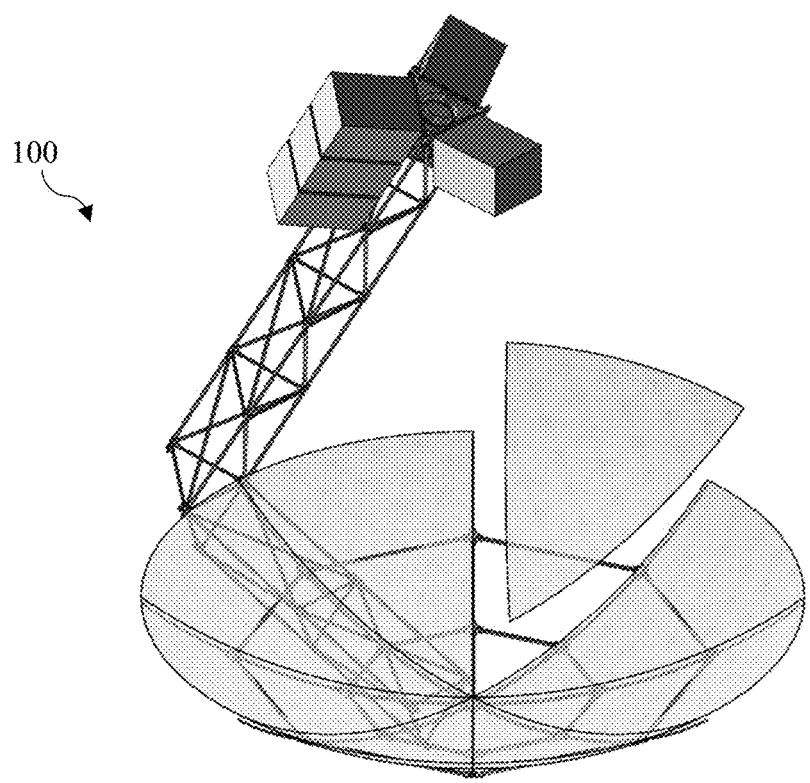
FIG. 35A illustrates a perspective view of an example of a parabolic antenna truss structure design showing various strut and node connections designed for 2-dimensional welding from the exterior position, according to embodiments of the present disclosure.
Figure 35B:
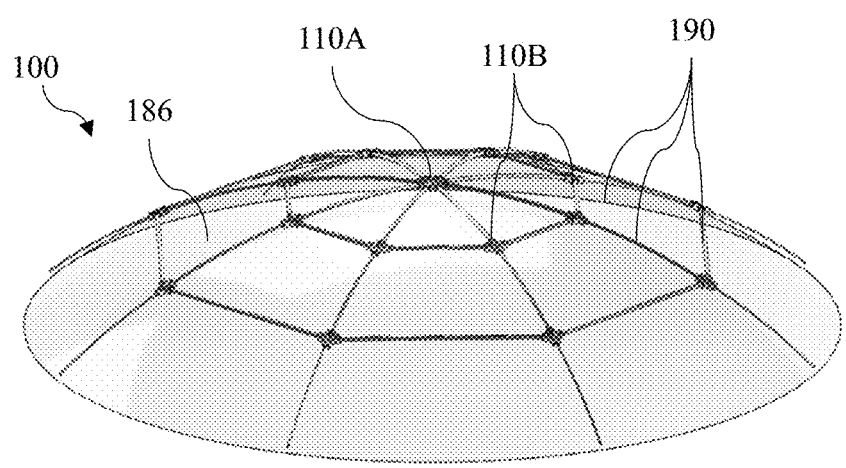
FIG. 35B illustrates another perspective view of the parabolic antenna truss structure design of FIG. 35A, according to embodiments of the present disclosure.

A parabolic antenna truss structure designs can also be provided with the node design described herein. FIG. 35A illustrates a perspective view of an example of a parabolic antenna truss structure design showing various strut and node connections designed for 2-dimensional welding from the exterior position. FIG. 35B illustrates another perspective view of the parabolic antenna truss structure design of FIG. 35A.

As shown in FIGS. 35A and 35B, node members 110A and 110A and struts 190 can be assembled to form a parabolic antenna truss structure 100. Using a node-and-strut design to make the stiffened structure, the node and strut connections are mechanically assembled (e.g., using the robotic arms attached to a powered satellite). The struts 190 start connecting at a central hub node member 110A in the center of the parabolic dish and the additional rings or webs are connected all the way out to the desired perimeter of the dish with cross-member node members 110B. The reflector element 186 can be a metallic mesh that has integrated stiffeners and/or attach points that will connect to holes/attach points on the nodes members 110A and 110B. The parabolic dish shown can also be a mirror or segments of mirrors that attach at the nodes members 110A and 110B (FIG. 35A).

Figure 36:
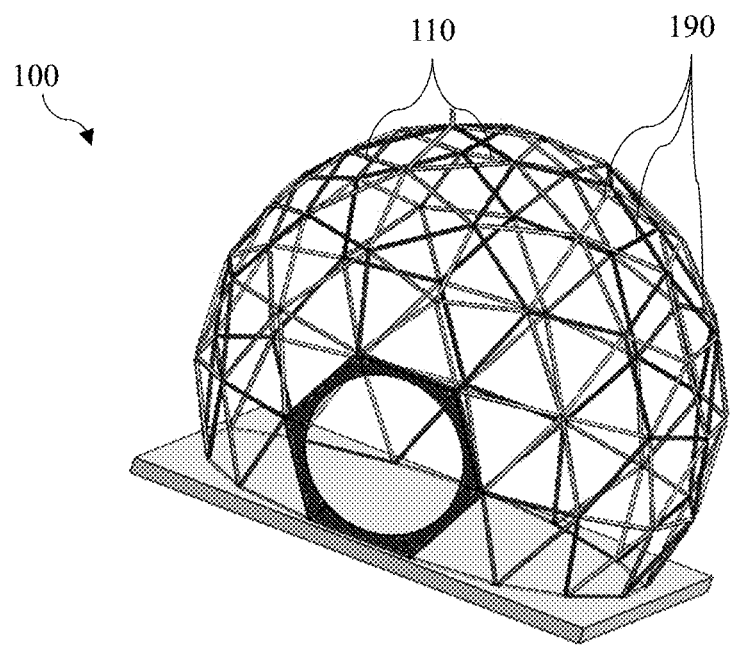
FIG. 36 illustrates a perspective view of an example of a geodesic space frame truss structure with node and strut design, according to embodiments of the present disclosure.
Figure 37:
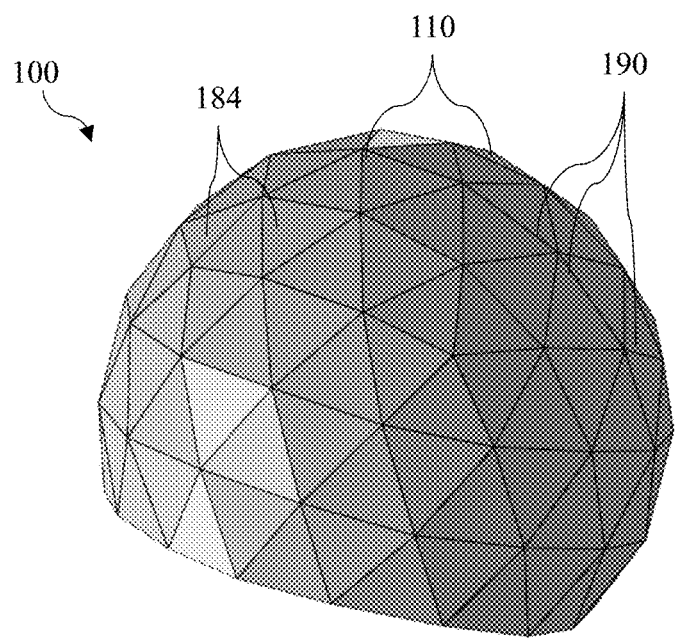
FIG. 37 illustrates a perspective view of an example of a geodesic space frame truss structure with cover panels seal-welded and joined to the nodes to create a hermetically sealed habitat or vessel, according to embodiments of the present disclosure.

Even further concepts for truss structures can lead to sealed vessels that can be used as air-tight habitats or containment of pressured fuels/gases for fuel depots. FIGS. 36 and 37 illustrates perspective views of examples of a geodesic space frame truss structure with node and strut design. As shown in FIGS. 36 and 37, the backbone for this type of structure can use node members 110 and struts 190.

Figure 38:
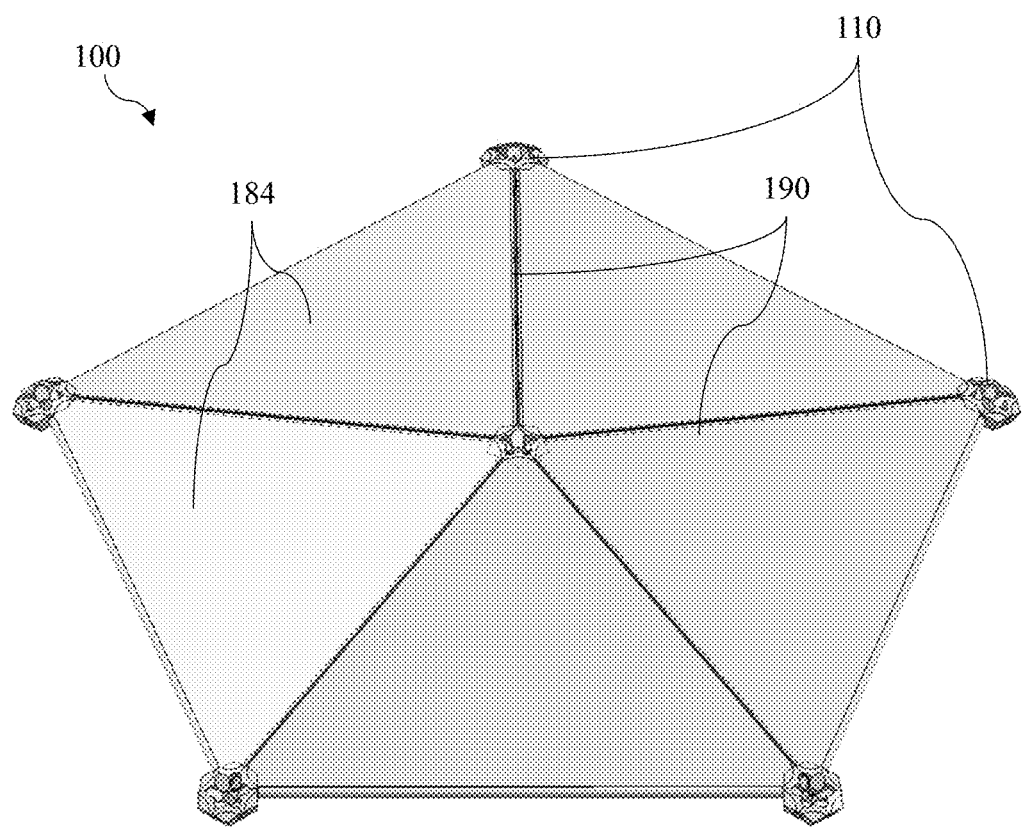
FIG. 38 illustrates a perspective view of an example of a recurring pentagonal node with panels fit up on top of a connecting bar that is supported by strut underneath, allowing the panel to be welded to the bars and nodes in the same 2-D path, according to embodiments of the present disclosure.

FIG. 38 illustrates a perspective view of an example of a recurring pentagonal node with panels fit up on top of a connecting bar that is supported by strut underneath, allowing the panel to be welded to the bars and nodes in the same 2-D path. As shown in FIG. 38, the geodesic vessel is comprised of hexagonal and pentagonal nodes where panels 184 are fit up with struts 190, a machined connector bar, and node members 110 such that each individual panel 184 can be butt-lap welded in 2-dimensions along its perimeter.

Accordingly, the designs disclosed herein provide an ability to build structures in space more efficiently to enable capability growth and capability preservation of various space-based functions such as human exploration, scientific discovery, and satellite operations. The structures can be stored in a compact payload and assembled in space. Alignment mechanisms to facilitate automated assembly are provided to produce strong and durable truss structures that can be assembled in space.

Various examples of aspects of the disclosure are described below as clauses for convenience. These are provided as examples, and do not limit the subject technology.

Clause A: an assembly module for assembling satellites in space, the assembly module comprising: a support base; an actuation arm extending from the support base; and an assembly table configured to secure a node of a truss structure; and multiple assembly arms extending form the assembly table, each of the assembly arms being configured to secure a corresponding strut with respect to the node, each of the assembly arms being pivotable with respect to the assembly table.

Clause B: an assembly system comprising: a storage module comprising: a housing; multiple struts and multiple nodes stored within the housing; and multiple satellite modules releasably attached to an outer surface of the housing; and an assembly module releasably attached to the housing of the storage module, at least a portion of the assembly module being pivotably coupled to the housing of the storage module to controllably expose an end of the housing, the assembly module comprising assembly elements configured to retrieve the multiple struts and the multiple nodes from within the housing, assemble a truss structure with the multiple struts and the multiple nodes, and connect the truss structure to one of the satellite modules.

Clause C: an assembly system comprising: a storage module comprising: a guide rail; multiple nodes each having an engagement element configured to engage with the guide rail such that the nodes are moveable along the guide rail; and multiple struts arranged to surround the guide rail and the nodes; and an assembly module releasably attached to the storage module, the assembly module comprising: an assembly table for receiving a corresponding one of the nodes; an engagement pin extending from the assembly table for engaging the engagement element of the corresponding one of the nodes; and assembly arms extending from the assembly table and configured to controllably secure the struts with respect to the corresponding one of the nodes.

One or more of the above clauses can include one or more of the features described below. It is noted that any of the following clauses may be combined in any combination with each other, and placed into a respective independent clause, e.g., clause A, B, or C.

Clause 1: each of the assembly arms comprises multiple gripper elements configured to secure at different longitudinal locations along the corresponding strut.

Clause 2: each of the assembly arms is extendable to adjust a distance of a gripper element away from the assembly table.

Clause 3: the assembly arms extend away from a common focal point.

Clause 4: the actuation arm terminates in an end effector.

Clause 5: the end effector comprises fingers that are configured to splay apart to engage an inner surface within the corresponding strut.

Clause 6: the end effector comprises a pair of fingers pivotably coupled to each other, wherein each of the fingers comprises a continuous band driven by at least one wheel.

Clause 7: an engagement element for releasably securing to a storage module containing the node and the corresponding strut, the engagement element being pivotably coupled to the support base.

Clause 8: a weld head configured to be advanced to apply a force while welding the node when positioned on the assembly table.

Clause 9: radiator elements deployable from a periphery of the support base; solar panels deployable from the periphery of the support base; and a thruster.

Clause 10: the storage module is a first storage module; and the assembly system further comprises a second storage module releasably attached to the assembly module on a side of the assembly module that is opposite the first storage module.

Clause 11: the second storage module comprises: an additional housing; multiple additional struts and multiple additional nodes stored within the additional housing; and multiple additional satellite modules releasably attached to an outer surface of the additional housing.

Clause 12: the assembly module further comprises: an engagement element releasably attached to the housing of the storage module; and a support base pivotably coupled to the engagement element, the support base supporting the assembly elements.

Clause 13: the assembly elements comprise an actuation arm; an assembly table configured to secure one of the nodes; and multiple assembly arms extending form the assembly table, each of the assembly arms being configured to secure a corresponding one of the struts with respect to the one of the nodes, each of the assembly arms being pivotable with respect to the assembly table.

Clause 14: the storage module further comprises a spring element biasing the nodes toward an end of the guide rail.

Clause 15: the storage module further comprises a housing containing the nodes and the struts.

Clause 16: the storage module further comprises multiple satellite modules releasably attached to an outer surface of the housing.

Clause 17: the assembly module further comprises an actuation arm configured to transport the corresponding one of the nodes from the storage module to the assembly table and a corresponding one of the struts from the storage module to a corresponding one of the assembly arms.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

What is claimed is:

1. An assembly module for assembling satellites in space, the assembly module comprising:
    a support base;
    an actuation arm extending from the support base; and
    an assembly table configured to secure a node of a truss structure; and
    multiple assembly arms extending form the assembly table, each of the assembly arms being configured to secure a corresponding strut with respect to the node, each of the assembly arms being pivotable with respect to the assembly table.

2. The assembly module of claim 1, wherein each of the assembly arms comprises multiple gripper elements configured to secure at different longitudinal locations along the corresponding strut.

3. The assembly module of claim 1, wherein each of the assembly arms is extendable to adjust a distance of a gripper element away from the assembly table.

4. The assembly module of claim 1, wherein the assembly arms extend away from a common focal point.

5. The assembly module of claim 1, wherein the actuation arm terminates in an end effector.

6. The assembly module of claim 5, wherein the end effector comprises fingers that are configured to splay apart to engage an inner surface within the corresponding strut.

7. The assembly module of claim 5, wherein the end effector comprises a pair of fingers pivotably coupled to each other, wherein each of the fingers comprises a continuous band driven by at least one wheel.

8. The assembly module of claim 1, further comprising an engagement element for releasably securing to a storage module containing the node and the corresponding strut, the engagement element being pivotably coupled to the support base.

9. The assembly module of claim 1, further comprising a weld head configured to be advanced to apply a force while welding the node when positioned on the assembly table.

10. The assembly module of claim 1, further comprising:
    radiator elements deployable from a periphery of the support base;
    solar panels deployable from the periphery of the support base; and
    a thruster.

11. An assembly system comprising:
    a storage module comprising:
        a housing;
        multiple struts and multiple nodes stored within the housing; and
        multiple satellite modules releasably attached to an outer surface of the housing; and
    an assembly module releasably attached to the housing of the storage module, at least a portion of the assembly module being pivotably coupled to the housing of the storage module to controllably expose an end of the housing, the assembly module comprising assembly elements configured to retrieve the multiple struts and the multiple nodes from within the housing, assemble a truss structure with the multiple struts and the multiple nodes, and connect the truss structure to one of the satellite modules.

12. The assembly system of claim 11, wherein:
    the storage module is a first storage module; and
    the assembly system further comprises a second storage module releasably attached to the assembly module on a side of the assembly module that is opposite the first storage module.

13. The assembly system of claim 12, wherein the second storage module comprises:
    an additional housing;
    multiple additional struts and multiple additional nodes stored within the additional housing; and
    multiple additional satellite modules releasably attached to an outer surface of the additional housing.

14. The assembly system of claim 11, wherein the assembly module further comprises:
    an engagement element releasably attached to the housing of the storage module; and
    a support base pivotably coupled to the engagement element, the support base supporting the assembly elements.

15. The assembly system of claim 11, wherein the assembly elements comprise
    an actuation arm;
    an assembly table configured to secure one of the nodes; and
    multiple assembly arms extending form the assembly table, each of the assembly arms being configured to secure a corresponding one of the struts with respect to the one of the nodes, each of the assembly arms being pivotable with respect to the assembly table.

16. An assembly system comprising:
    a storage module comprising:
        a guide rail;
        multiple nodes each having an engagement element configured to engage with the guide rail such that the nodes are moveable along the guide rail; and
        multiple struts arranged to surround the guide rail and the nodes; and
    an assembly module releasably attached to the storage module, the assembly module comprising:
        an assembly table for receiving a corresponding one of the nodes;
        an engagement pin extending from the assembly table for engaging the engagement element of the corresponding one of the nodes; and assembly arms extending from the assembly table and configured to controllably secure the struts with respect to the corresponding one of the nodes.

17. The assembly system of claim 16, wherein the storage module further comprises a spring element biasing the nodes toward an end of the guide rail.

18. The assembly system of claim 16, wherein the storage module further comprises a housing containing the nodes and the struts.

19. The assembly system of claim 18, wherein the storage module further comprises multiple satellite modules releasably attached to an outer surface of the housing.

20. The assembly system of claim 18, wherein the assembly module further comprises an actuation arm configured to transport the corresponding one of the nodes from the storage module to the assembly table and a corresponding one of the struts from the storage module to a corresponding one of the assembly arms.

* * * * *